United States Patent [19]

Kanner et al.

[11] 4,018,723

[45] Apr. 19, 1977

[54] MORPHOLINO-MODIFIED POLYSILOXANE-POLYOXYALKYLENE COPOLYMERS AND THEIR USE AS FOAM STABILIZERS IN POLYURETHANES

[75] Inventors: Bernard Kanner, West Nyack; Bela Prokai, Mahopac, both of N.Y.

[73] Assignee: Union Carbide Corporation, New York, N.Y.

[22] Filed: Feb. 25, 1975

[21] Appl. No.: 552,996

[52] U.S. Cl. .................. 260/2.5 AH; 260/45.7 P; 260/46.5 E; 260/247.7 L; 260/824 R
[51] Int. Cl.$^2$ ............ C07D 295/04; C07D 295/08; C08G 18/14; C08G 77/26
[58] Field of Search ........... 260/247.7 L, 46.5 E, 260/2.5 AH, 824 R

[56] References Cited
UNITED STATES PATENTS

| | | | |
|---|---|---|---|
| 3,278,465 | 10/1966 | Twitchett et al. | 260/2.5 AH |
| 3,594,334 | 7/1971 | Marlin | 260/2.5 AH |
| 3,642,670 | 2/1972 | Kanner et al. | 260/2.5 AH |
| 3,658,867 | 4/1972 | Prokai | 260/448.2 N |
| 3,793,300 | 2/1974 | Prokai et al. | 260/2.5 AH |

FOREIGN PATENTS OR APPLICATIONS 1,044,629   10/1966   United Kingdom ......... 260/2.5 AH

*Primary Examiner*—Donald E. Czaja
*Assistant Examiner*—H. H. Fletcher
*Attorney, Agent, or Firm*—Marylin Klosty

[57] ABSTRACT

Organosilicone compositions are provided which comprise polysiloxane-polyoxyalkylene copolymers containing monofunctional siloxy units ($M_o$) and difunctional siloxy units ($D_o$), an average of between about 2 and about 100 silicon-bonded morpholino-bearing groups (Q) for every two moles of $M_o$ and an average of between 2 and about 30 silicon-bonded, organic-capped polyoxyalkylene blocks (E) for every two moles of $M_o$, the monofunctional units encompassed by $M_o$ having at least two alkyls bonded to the respective silicon atoms thereof and the difunctional units encompassed by $D_o$ having at least one alkyl bonded to the respective silicon atoms thereof, the remaining organic group bonded to silicon of said monofunctional and difunctional siloxy units being alkyl, Q or E. The polymers of the invention find particular application in the manufacture of cellular urethane products including flame-retarded urethane foam.

40 Claims, No Drawings

MORPHOLINO-MODIFIED POLYSILOXANE-POLYOXYALKYLENE COPOLYMERS AND THEIR USE AS FOAM STABILIZERS IN POLYURETHANES

BACKGROUND OF THE INVENTION

The present invention relates to a particular novel class of polysiloxane-polyoxyalkylene copolymers and their use in the formation of cellular urethane products, particularly flexible urethane foam including flame-retarded foam.

It is well known that the urethane linkages of cellular urethanes are formed by the exothermic reaction of a polyfunctional isocyanate and a polyfunctional active hydrogen-containing compound in the presence of a catalyst, and that the cellular structure is provided by gas evolution and expansion during the urethane-forming reaction. Illustrative of suitable active hydrogen-containing compounds are polyether polyols and polyester polyols. In accordance with the "one-shot" process which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting. Among the various types of silicon-containing compositions reported in the literature as effective stabilizers of urethane foam derived from a polyester polyol and a polyether polyol are those described in U.S. Pat. No. 3,594,334 and Reissue Pat. No. 27,541, respectively. From the standpoint of potency and quality of foam product, especially effective foam stabilizers described in these patents are those in which silicon of the siloxane portion of the respective copolymer components is substituted with methyl groups only.

In recent years considerable effort has been expended and continues, to reduce the recognized objectionable characteristic of urethane polymers in their ability to ignite readily and burn with an open flame. One approach to this problem is to include a flame-retarding agent such as various phosphorus and/or halogen-containing compounds as a component of the foam-producing reaction mixture, and in this respect, to develop improved and more efficient flame-retarding agents. An associated problem is to provide surfactants which not only function to stabilize flame-retarded foam but which also allow for the formation of flame-retarded foam of reduced burning extent relative to surfactants designed for stabilization of non flame-retarded flame. For example, the polymethylsiloxane-polyoxyalkylene copolymers described in the aforementioned patents are excellent stabilizers of non flame-retarded and are also capable of stabilizing flame-retarded foam. However, the flammability properties of the flame-retarded foam products appear to indicate an adverse effect of the surfactant on flame-retardant efficiency.

It is desirable, therefore, and is a principal object of this invention to provide a new class of polysiloxane-polyoxyalkylene copolymers which, in addition to the ability to stabilize non-flame-retarded cellular urethanes, offer particular utility as stabilizers of flame-retarded products.

Various other objects and advantages of this invention will become apparent to those skilled in the art from the accompanying description and disclosure.

SUMMARY OF THE INVENTION

In accordance with one aspect of the present invention a particular class of morpholino-bearing organosiloxane-polyoxyalkylene polymers are provided which contain chemically combined monofunctional siloxy units ($M_o$) and difunctional siloxy units ($D_o$), an average of from about two to about 100 silicon-bonded morpholino-substituted organic groups (Q) and an average of from about 2 to about 30 silicon-bonded polyoxyalkylene blocks (E) for every two moles of monofunctional siloxy units ($M_o$) contained in the polymer. The essential silicon-bonded morpholino-substituted organic groups are collectively referred to herein by the symbol "Q" and are any of the groups encompassed by the formula,

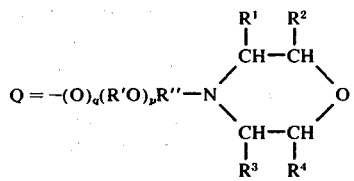

where: $p$ is zero or has an average value from about one to about four; $q$ is zero or one provided $q$ is one when $p$ has a value of more than one; $R'$ is bivalent alkylene having from two to four carbon atoms; $R''$ is bivalent alkylene having from two to six carbon atoms; and $R^1$, $R^2$, $R^3$ and $R^4$ are independently hydrogen or alkyl having from one to four carbon atoms.

In the monofunctional siloxy units encompassed by $M_o$, the respective silicon atoms are bonded to two alkyl groups (R), the third silicon-bonded organic group being the aforesaid morpholino-bearing group (Q), polyoxyalkylene block (E) or alkyl group (R). Thus, included within the scope of $M_o$ are monofunctional units having the following unit formulae which for brevity are also individually referred to herein as the M, M' and M'' units, as shown:

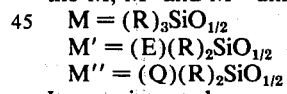

In any given polymer composition of the present invention, the $M_o$ units may be the same as or different from one another. In the difunctional siloxy units encompassed by $D_o$, at least one of the two organic groups bonded to the respective silicon atoms is alkyl and the second silicon-bonded organic group is Q, E or R. Thus, included within the scope of $D_o$ are difunctional units having the following unit formulae which, for brevity, are also individually referred to herein as the X, Y and Z units, as shown:

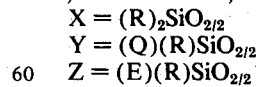

The organosiloxane-polyoxyalkylene polymers described herein may contain any combination or subcombination of the respective siloxy units within the scope of $M_o$ and $D_o$ provided an average of from about 2 to about 100 morpholino-bearing groups (Q) and from about 2 to about 30 polyoxyalkylene blocks (E) are present, as encompassed by the following Formula I,

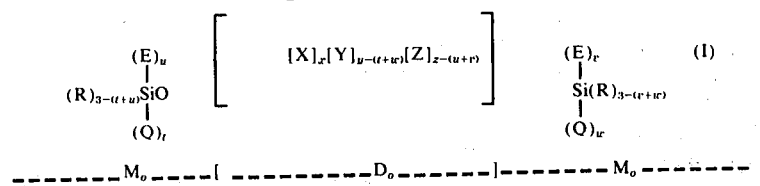

wherein: Q, E, R, X, Y and Z have the aforesaid significance; each of $t$, $u$, $v$, $w$, the sum $t+u$ and the sum $v+w$ independently has a value of zero or one; each of the sum $t+w$ and the sum $u+v$ independently has a value of zero, one or two, it being evident that the value of the sum $t+u+v+w$ is also zero, one or two; $x$ is zero or any positive number having an average value up to about 200; $y$ has an average value from about 2 to about 100; and $z$ has an average value from about 2 to about 30. It is evident from Formula I that $x$, $y-(t+w)$ and $z-(u+v)$ designate the average number of moles of the respective difunctional X, Y and Z units which are present for every two moles of total monofunctional units ($M_o$) as shown, and that the values of $y$ and $z$ correspond to the total number of Q and E groups, respectively, contained in the polymer. Further, when $t+w$ and $u+v$ are zero, $y$ and $z$ also correspond to the respective total number of difunctional Y and Z units contained in the polymer for every two moles of $M_o$.

The polymers of the invention are useful as surfactant-providing compositions finding particular application in the manufacture of cellular urethane products, including flame-retarded foam.

In accordance with another aspect of the present invention, there is provided a process for producing polyurethane foam which comprises reacting and foaming a reaction mixture of: (a) a polyester polyol or a polyether polyol reactant containing an average of at least two hydroxyl groups per molecule; (b) a polyisocyanate reactant containing at least two isocyanato groups per molecule; (c) a blowing agent; (d) a catalyst comprising a tertiary-amine; and (e) a foam stabilizing component comprising the morpholino-substituted organosiloxane-polyoxyalkylene polymers of the present invention. In addition to their efficacy as stabilizers of non flame-retarded urethane foam, it has been found that the organo-silicone polymers of this invention possess the further advantageous property of allowing for the formation of flame-retarded foam of acceptable overall quality, and reduced combustibility relative to unmodified polyalkylsiloxane-polyoxyalkylene copolymers. In accordance with this aspect of the present invention, flame-retarded polyester-based and polyether-based urethane foam are provided by reacting and foaming respective reaction mixtures which additionally include a flame-retarding agent.

In providing the polyurethane foams of the invention, the morpholino-substituted organosiloxane-polyoxyalkylene polymers can be introduced to the foam producing reaction mixtures either as such, as a blend with various organic additives including organic surfactants, or in combination with one or more of the polyester or polyether polyol reactant, blowing agent, amine catalyst and, when used, the flame-retarding agent.

DETAILED DESCRIPTION OF THE INVENTION AND PREFERRED EMBODIMENTS

The functionality of the respective types of structural units encompassed by $M_o$ and $D_o$ of the polymers of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the $M_o$ units are chain terminating or end-blocking units and the respective oxygen atoms thereof are shared with silicon of one other unit which can be Y or Z and, when present, X. On the other hand, X, Y and Z are difunctional and thus the respective two oxygen atoms associated with each silicon atom thereof are shared with respective silicon atoms of other units. Thus, the reoccurring difunctional units may be distributed in the polymer randomly, alternately, as sub-blocks of repeating units of the same type, or in any combination of such arrangements. Further, the polymers of the invention comprise mixtures of polymer species which differ in molecular weight, total polyoxyalkylene and siloxane contents, and in the type, arrangement and relative proportions of units. Therefore, as expressed herein, the parameters employed to denote these variables are average values and are based on the relative proportions of reactants from which the various units are derived. It is to be further understood that, consistent with convention in the art to which the present invention pertains, as expressed herein, the formulas of the polymers indicate their overall average empirical composition rather than any particular ordered arrangement of units or molecular weight of any particular polymer species. With this understanding, the average composition of the respective types of polymers encompassed by Formula I above may be expressed by the following formulae wherein the various siloxy units are shown in chemically combined form:

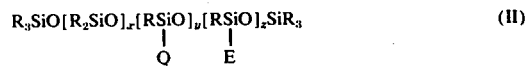 (II)

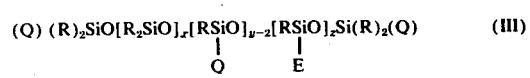 (III)

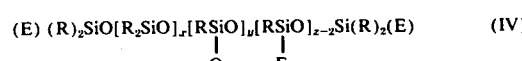 (IV)

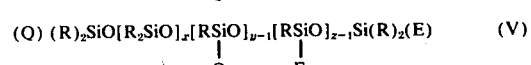 (V)

wherein: R, Q, E, $x$, $y$ and $z$ are as above defined.

The silicon-bonded R groups are alkyls having from one to ten carbon atoms including linear and branched alkyls. Illustrative of suitable groups encompassed by R are: methyl, ethyl, n-propyl, isopropyl, n-butyl, t-butyl, pentyl, hexyl, octyl and decyl. Of the various groups represented by R, the lower alkyls (that is, those having from one to four carbon atoms) are preferred of which methyl is especially suitable. It is to be understood that the R groups may be the same throughout the polymer or they may differ as between or within units without departing from the scope of this invention. For example, when the endblocking monofunctional units are M, that is, $R_3SiO_{1/2}$-, they may be trimethylsiloxy units and the difunctional units, $R_2SiO_{2/2}$, when present, may be diethylsiloxy and/or methylethylsiloxy units.

In the Q substituents of the siloxane portion of the polymers of this invention, that is, in

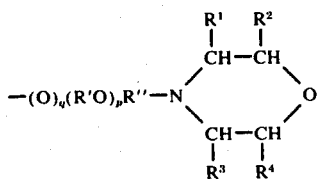

the $R^1$ through $R^4$ groups are, as previously defined, hydrogen or $C_1$ to $C_4$ alkyls. Usually, no more than two are alkyls as in the 2,6-dimethylmorpholino nucleus. Preferably, each of $R^1$, $R^2$, $R^3$ and $R^4$ is hydrogen. The R' and R'' groups of Q are bivalent alkylene radicals, of the series, $-C_cH_{2c}-$ and $-C_dH_{2d}-$, respectively, where c is an integer having a value from 2 to 4 (—R'—) and d is an integer having a value from 2 to 6 (—Rf''—). Illustrative of the linear and branched bivalent alkylene radicals encompassed by —R'— and —R''— are: ethylene; 1,3-propylene; 1,2-propylene; 1,4-butylene; 1,2-butylene; 2,3-butylene; and, in addition —R''— can be 1,5-pentylene, 1,2-pentylene, 1,6-hexylene, and the like. Preferably, —R'— has from 2 to 3, and R'' has from 2 to 4, carbon atoms. It is to be understood that when p of the morpholino-bearing Q group has an average value from about one to about four, $-(R'O)_p-$ may be ethyleneoxy, poly(ethyleneoxy), propyleneoxy, poly(propyleneoxy), or a combination of different alkyleneoxy units. For example, included within the scope of $-(R'O)_p-$ are poly(alkyleneoxy) groups such as $[-(C_2H_4O)_{p°}\cdot(C_3H_6O)_{p°°}-]$ where $p°$ and $p°°$ are positive numbers and the average value of $p°+p°°$ is from about one to about four.

Illustrative of the Y units $[(Q)(R)SiO_{2/2}]$ of the polymers of this invention are the following:

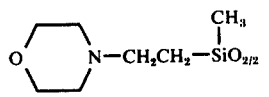

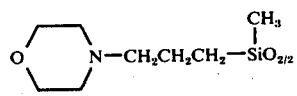

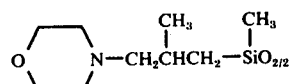

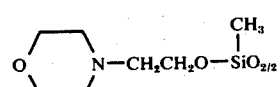

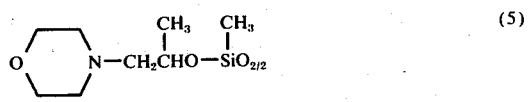

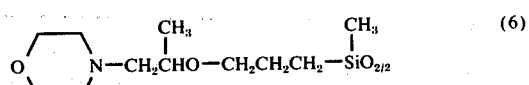

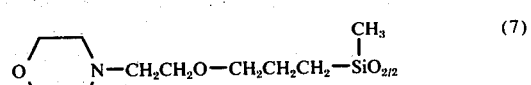

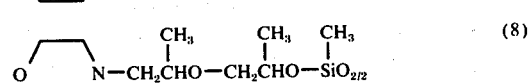

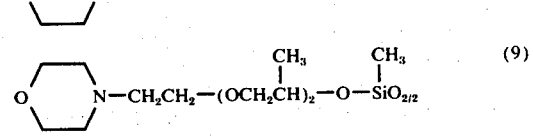

It is to be understood that the polymers of this invention may contain any one of the various types of Y units illustrated by the above as essentially the sole type of Q-modified difunctional unit or the polymers may comprise any combination thereof.

Illustrative of the Q-modified monofunctional units (M'') are corresponding morpholinoalkyl dialkylsiloxy units such as: 3-(morpholino)propyl dimethylsiloxy wherein Q is as in (2) above; morpholinoalkoxy dialkylsiloxy such as 2-(morpholino)ethoxy dimethylsiloxy wherein Q is as in (4) above; morpholinoalkoxyalkyl dialkylsiloxy such as 3-[2-(morpholino)-1-(methyl)ethoxy]propyl dimethylsiloxy wherein Q is as in (6) above; and morpholinoalkyldi(oxyalkylene)oxy dialkylsiloxy such as wherein Q is as shown in (9) above.

The average composition of the preferred polyoxyalkylene blocks (E) of the Z and M' units is, $-(R°)_r-(OC_aH_{2a})_bOG$, wherein: r is zero or one; $-R°-$ comprises a bivalent alkylene group a carbon atom of which is bonded to silicon; $-(OC_aH_{2a})_b-$ represents a polyoxyalkylene chain, a having a value from 2 to 4 and b having an average value from about 3 to about 100.

Usually, at least 20 weight percent of the polyoxyalkylene chain is constituted of oxyethylene. The particular composition of the polyoxyalkylene chain depends on the desired end use application of the morpholino-modified copolymers described herein, as discussed in greater detail hereinbelow.

When present, the linking group $(-R°-)$ between silicon and that portion of the polyoxyalkylene block (E) shown as $-(OC_aH_{2a})_bOG$, is a bivalent alkylene group, an -alkylene-C(O)— group or an -alkylene-NH—C(O)— group wherein the free valence of alkylene of the latter two groups is bonded to silicon. In these linking groups, alkylene has the more specific formula, $-C_eH_{2e}-$, where e has a value from 2 to 6 and is usually no more than four. Illustrative of suitable groups encompassed by R° are: ethylene, trimethylene, propylene, tetramethylene, hexamethylene; corresponding $-C_eH_{2e}-C(O)-$ groups which together with oxygen of the polyoxyalkylene chain form an ester linkage; and corresponding $-C_eH_{2e}-NH-C(O)-$ groups which in combination with oxygen of the polyoxyalkylene chain form carbamate linkages.

As further indicated by the formula of the polyoxyalkylene blocks (E) of the Z and M' units, the poly(oxyalkylene) chain is terminated by the organic group, GO—, wherein G is a monovalent organic capping group. Illustrative of the organic caps encompassed by G are such groups as: $R^{\infty}$—, $R^{\infty}NHC(O)$—, and $R^{\infty}C(O)$—, wherein $R^{\infty}$ is a monovalent hydrocarbon radical having from 1 to 12 carbon atoms, and is usually free of aliphatic unsaturation. The groups GO—) which endblock the polyoxyalkylene chains are, therefore, corresponding $R^{\infty}O$—, $R^{\infty}NHC(O)O$— and $R^{\infty}C(O)O$— monovalent organic radicals. In the aforesaid capping (G) and terminal (GO—) groups, $R^{\infty}$ can be any of the following: an alkyl group including linear and branched chain alkyl groups having the formula, $C_fH_{2f+1}$—, wherein $f$ is an integer from 1 to 12, such as, for example, methyl, ethyl, n-propyl, isopropyl, n-butyl, octyl and dodecyl groups; a cycloaliphatic radical including monocyclic and bicyclic groups such as, for example, cyclopentyl, cyclohexyl and bicyclo[2.2.1-]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl-substituted cycloaliphatic radicals such as, for example, methylcyclopentyl and phenylcyclohexyl radicals; and the like. It is evident, therefore, that the terminal group (GO—) of the polyoxyalkylene chain can be corresponding alkoxy, aryloxy, aralkoxy, alkaryloxy, cycloalkoxy, acyloxy, aryl—C(O)O—, alkyl carbamate and aryl carbamate groups.

The generally preferred $R^{\infty}$ groups are phenyl, lower alkyl radicals, the lower alkyl-substituted aryl groups and the aryl-substituted lower alkyl groups, wherein the term "lower alkyl" denotes $C_1$-$C_4$ alkyl radicals. Therefore, illustrative of the preferred capping groups represented by G are: methyl, ethyl, propyl, butyl, phenyl, benzyl, phenylethyl ($C_6H_5$—$C_2H_4$—), acetyl, benzoyl, methylcarbamyl [$CH_3NHC(O)$—], ethylcarbamyl [$C_2H_5NHC(O)$—], propyl- and butyl-carbamyl groups, phenylcarbamyl [$C_6H_5NHC(O)$—], tolylcarbamyl [$(CH_3)C_6H_4NHC(O)$—], benzylcarbamyl [$C_6H_5CH_2NHC(O)$—], and the like.

It is to be understood that the terminal organic radical (GO—) of the respective polyoxyalkylene blocks of the polymers of the present invention may be the same throughout the polymer or may differ. For example, the polymer compositions of this invention can contain polyether blocks in which the terminal group (GO—) is methoxy, and other polyether groups in which GO— is a hydrocarbylcarbamate group such as methylcarbamate, $CH_3NHC(O)O$—, or benzyloxy ($C_6H_5CH_2O$—).

When used to stabilize flexible urethane foam, an average of from about 50 to about 85 weight percent of the Q-modified polysiloxane-polyoxyalkylene polymers of the invention is constituted of polyoxyalkylene blocks (E) which portion of the polymers is also referred to herein as the total polyether content. Correspondingly, the total siloxane content of the polymers is from about 50 to about 15 weight percent, and represents the sum of the combined weight of the units encompassed by $M_o$ and $D_o$ less the total weight of the polyoxyalkylene blocks (E).

Of the morpholino-bearing copolymers of the invention, the compositions having particular utility as stabilizers of polyether-derived urethane foam, are those within the scope of Formulas I-V wherein: $x$ has an average value from about 10 to about 200 and is preferably from about 20 to about 100; $y$ has an average value from about 2 to about 100, and is preferably no more than about 30; $z$ has an average value from about 2 to about 30 and is preferably from about 2 to about 10; and in the polyoxyalkylene block (E),

$r$ is zero or one, $R^o$ and G are as previously defined, and $a$ has a value from 2 to 4 provided from about 20 to about 75 weight percent of the oxyalkylene units of the polyoxyalkylene chain, —$(C_aH_{2a}O)_b$, is constituted of oxyethylene units, and $b$ has an average value such that the average molecular weight of the polyoxyalkylene chain is from about 1000 to about 6000. Usually, no more than about 65 weight percent of the chain is constituted of oxyethylene units. The remainder of the polyoxyalkylene chain is usually formed of oxypropylene, oxybutylene or a combination of such units, although preferably the remainder is oxypropylene. It is to be understood that the oxyethylene and other oxyalkylene units can be randomly distributed throughout the polyoxyalkylene chain or they can be grouped in respective sub-blocks.

Of the morpholino-bearing copolymers described herein, the compositions having particular utility as stabilizers of polyester polyol-derived urethane foam are those within the scope of Formulas I–V wherein: $x$ is zero or a positive number having an average value up to about 20 and is preferably no more than about 10; $y$ has an average value from about 2 to about 20, and is preferably no more than 10; $z$ has an average value from about 2 to about 30 and is preferably no more than about 15; and in the polyoxyalkylene block (E),

$r$ is zero or one, $R^o$ and G are as previously defined, and $a$ has a value from 2 to 4 provided at least 75 weight percent of the total polyoxyalkylene content of the polymer is constituted of oxyethylene units, and $b$ has an average value from about 3 to about 30. Usually, the average value of $b$ is from about 4 to about 15, and the average value of $a$ is from 2 to 2.25. The other oxyalkylene units with which oxyethylene may be in combination are oxypropylene, —$(C_3H_6O)$—, and oxybutylene, —$(C_4H_8O)$—, units. Preferably, when used to stabilize polyester urethane foam, the total average poly(oxyethylene) content of the polymers is from about 85 to about 100 weight percent.

In the polymers described herein, the alkyls (R) are of course bonded to silicon by silicon-to-carbon bonds. On the other hand, the respective morpholino-bearing groups (Q) and polyoxyalkylene blocks (E) specifically shown in Formulas II–V, may be linked to silicon by Si—C or Si—O bonds. Thus, the Q-modified polyoxyalkylene polymers of the invention may be: (1) non hydrolyzable with respect to both the polyoxyalkylene blocks and morpholino-substituted Q groups (when $r$ is one and $q$ is zero); (2) hydrolyzable with respect to both the polyoxyalkylene blocks and morpholino-substituted Q groups (when $r$ is zero and $q$ is one); (3) hydrolyzable with respect to the polyoxyalkylene blocks and non hydrolyzable with respect to the morpholino-substituted Q groups (when $r$ is zero, $q$ is zero, and $p$ is either zero or one); and (4) non hydrolyzable with respect to the polyoxyalkylene blocks and hydrolyzable with respect to the morpholino-substituted Q groups (when both r and q are one).

From the standpoint of use as stabilizers of flame-retarded flexible urethane foam derived from either a polyether polyol or a polyester polyol, preferred copolymers of the invention are those in which Q is bonded to silicon by Si—C bonds. Such preferred Q groups are morpholinoalkyl (that is, when in the formula for Q, p and q are both zero) and morpholinoalkoxyalkyl (that is, when p is one and q is zero).

When the flame-retarded foam is derived from a polyether polyol, illustrative morpholinoalkyl- and morpholinoalkyoxyalkyl-substituted copolymers for stabilization thereof are those having the following respective average compositions:

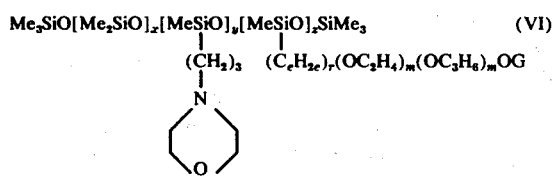

(VI)

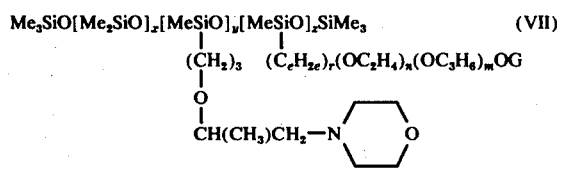

(VII)

wherein: Me represents methyl (—CH$_3$); x has an average value from about 10 to about 200, y has an average value from about 2 to about 100, z has an average value from about 2 to about 30, the average values of x, y and z in any given polymer composition being such that the siloxane and polyether contents of the polymer are within the aforesaid ranges of from about 15 to about 50 (siloxane) and from about 85 to about 50 (polyether) weight percent; e is an integer from 2 to 4; r is zero or one; G represents an R$^\infty$—, R$^\infty$C(O)— or R$^\infty$NHC(O)— group, where R$^\infty$ is lower alkyl, ar(lower)alkyl, or phenyl; and m and n are positive numbers such that the average oxyethylene content of the oxyalkylene chain ranges from about 20 to about 65 weight percent and the average molecular weight of the chain is from about 1000 to about 6000. Most preferably, in Formulas VI and VII the average values of x, y and z are from about 20 to about 100 (x), from about 2 to about 30 (y) and from about 2 to about 10 (z).

When it is desired to employ copolymers of the invention as stabilizers of flame-retarded urethane foam derived from a polyester polyol, typical morpholinoalkyl- and morpholinoalkoxyalkyl-substituted copolymers for this purpose are those having the following respective average compositions:

Me$_3$SiO[Me$_2$SiO]$_x$[MeSiO]$_y$[MeSiO]$_z$SiMe$_3$    (VIII)
          |           |
       (CH$_2$)$_3$   (C$_e$H$_{2e}$)$_r$(OC$_2$H$_4$)$_b$OG
          |
          N
         / \
        /   \
        \   /
         \_/
          O

-continued

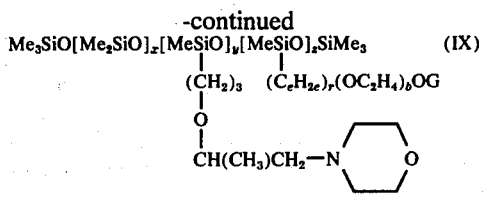

(IX)

wherein: Me represents methyl; e is an integer from 2 to 4; r is zero or one; G is R$^\infty$, R$^\infty$C(O)— or R$^\infty$NHC(O)— in which R$^\infty$— is lower alkyl, ar(lower)alkyl or phenyl; x is zero or a positive number having an average value up to about 20 and is usually no more than about 10; y has an average value from about 2 to about 20 and is usually no more than about 10; z has an average value from about 2 to about 30 and is usually no more than about 15; b has an average value from about 3 to about 30 and is usually from about 4 to about 15; and the values of x, y, z and b in any given polymer composition are such that the siloxane and polyether contents are within the aforesaid ranges from about 15 to about 50 (siloxane) and from about 85 to about 50 (polyether) weight percent. When the dialkylsiloxy units (X) are present, x usually has an average value of at least about 0.5, and more usually has an average value of at least about one.

The polymers of the invention are prepared by any one of a number of reactions. The particular method employed depends primarily on whether the respective bonds between silicon and the polyoxyalkylene blocks (E) and morpholino-bearing groups (Q) are Si—C or Si—O.

One method for providing polymer compositions of the invention in which the polyoxyalkylene blocks of the Z and/or M' units are linked to silicon through Si—C bonds comprises the catalyzed addition of monoolefinic polyoxyalkylene ethers to Q-substituted polyalkylsiloxane hydrides. This hydrosilation reaction is referred to herein as Method A and is illustrated by the following equation wherein the Q-modified Si-H reactant is expressed by Formula X, as shown:

Equation 1:

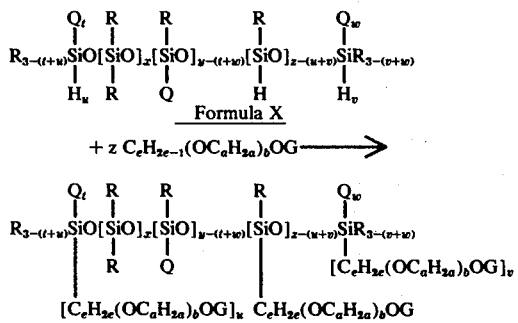

in which, as previously defined herein: Q is the silicon-bonded monovalent grouping, —(O)$_q$(R'O)$_p$R''—morpholino; R is alkyl; —(OC$_a$H$_{2a}$)$_b$OG is an organic-capped polyoxyalkylene chain; e is an integer having a value from 2 to 6; t, u, v w, t+u and v+w have respective values of zero or one; t+w and u+v have respective values of zero, one or two; x is zero or a positive number having an average value up to about 200; y has an average value from about 2 to about 100; and z has an average value from about 2 to about 30.

Preferably, the monoolefinic or alkenyl end-blocking group, $-C_eH_{2e-1}$, of the polyether reactant employed in Method A is vinyl, allyl or methallyl, the allyl end-blocked reactants being especially suitable. One method for preparing such polyether reactants comprises starting alkylene oxide polymerization with an alkenol having at least three carbon atoms such as allyl alcohol to provide $HO(C_aH_{2a}O)_bC_eH_{2e-1}$ (wherein $e$ has a value of at least 3), followed by capping of the terminal hydroxyl group with the aforesaid organic radical G—, such as methyl, phenyl, benzyl, acetyl, methylcarbamyl and like capping groups. Further details concerning the method of preparation of such polyether reactants are as described, for example, in British Patent Specifications 1,220,471 and 1,220,472. Alternatively, the polyether reactants can be prepared by starting the alkylene oxide polymerization with an alkanol such as methanol or butanol, an aralkyl alcohol such as benzyl alcohol, a phenol such as phenol itself and the like, followed by capping of the terminal hydroxyl group of the reaction product with the monoolefinic group such as vinyl, allyl, methallyl and the like. Of these monoolefinically unsaturated polyether reactants, allyl alcohol-started polyoxyalkylene ethers are especially suitable. When the polyether reactants comprise a combination of different oxyalkylene units, the various oxyalkylene units can be randomly distributed throughout the chain such as when a mixture of alkylene oxides is polymerized, or they can be arranged as sub-blocks such as when the respective alkylene oxides are polymerized sequentially.

The polymers of this invention wherein polyoxyalkylene blocks (E) are joined to silicon through an Si—O—C bond (for example, the compositions encompassed by Formulas VI through IX above wherein $r$ is zero), are provided by the catalyzed condensation of silicon-bonded hydrogen of the Q-substituted polyalkylsiloxane hydride fluids with hydrogen of the —OH group of hydroxyl-terminated polyether reactants. This method is referred to herein as Method B and is illustrated by the reaction of the following equation 2 in which the said hydride reactant has the average composition expressed by Formula X shown in above equation 1.

Equation 2:

Si-H Reactant of Formula X + z HO—$(C_aH_{2a}O)_bG$ 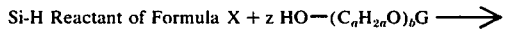

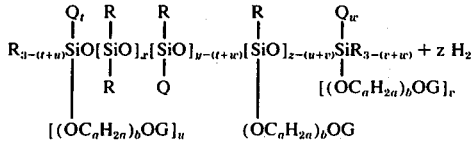

wherein: Q, R, $-(OC_aH_{2a})_bOG$, $t$ through $z$, $t+u$, $v+w$, $t+w$ and $u+v$ have the aforesaid significance such as is summarized with specific reference to equation 1.

From equations 1 and 2 it is evident that when $t$, $u$, $v$ and $w$ are zero, the respective Q-modified Si—H reactants and copolymer products are endblocked by M units $[(R)_3SiO_{1/2}]$ and the polymer products are of the type encompassed by Formula II, as illustrated by the following equations 1a and 2a:

Equation 1a:

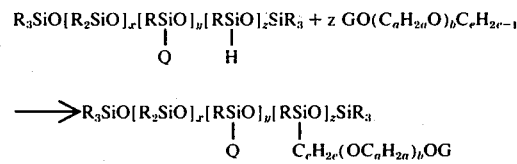

Equation 2a:

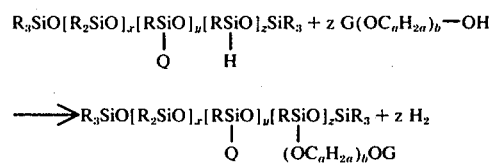

wherein R, Q, G, $x$, $y$, $z$, $a$ and $b$ are as previously defined.

It is also evident from equation 1 and 2 that: (1) when $t$ and $w$ are both one and thus $u$ and $v$ are zero, the endblocking units are M'' $[(Q)(R)_2SiO_{1/2}]$ and the polymer products are of the type encompassed by Formula III; (2) when $t$ and $w$ are both zero and $u$ and $v$ are both one, the enblocking units are M' $[(E)(R)_2SiO_{1/2}]$ and the copolymers are within the scope of Formula IV; (3) when $t$ and $v$ are both one and thus $u$ and $w$ are zero, the copolymers are endblocked by different monofunctional units (M' and M'') as defined by Formula V; and (4) when the sum $t+u+v+w$ is one, the copolymers also have different endblocking units, that is, a combination of M and M' or M''.

It is to be understood that the composition of the polyoxyalkylene chain, $-(OC_aH_{2a})_b-$, of the particular alkenyl-endblocked or hydroxyl-terminated polyether reactant employed in the reactions of equations 1 and 2 (as well as in the reactions of the other equations discussed below), is governed by the desired end use application of the morpholino-modified copolymer products. Thus, when the product is to be employed to stabilize polyether polyol-based urethane foam, the polyoxyalkylene chain of the polyether reactants is constituted, on the average, of from about 20 to about 75, and preferably from about 20 to about 65, weight percent of oxyethylene units, $-(OC_2H_4)-$, the remaining oxyalkylene units being oxypropylene and/or oxybutylene, thereby providing morpholino-modified copolymers in which the polyoxyalkylene blocks (E) have a corresponding oxyethylene content. Similarly, in applying the respective hydrosilation and condensation reactions of equations 1 and 2 to the formation of morpholino-modified copolymers intended for use as stabilizers of polyester polyol-based foam, the polyoxyalkylene content of the respective alkenyl-endblocked and hydroxyl-terminated polyether reactants is constituted, on the average, of at least 75 and preferably at least 85, weight percent of oxyethylene, the remaining oxyalkylene units being oxyethylene (which is preferred), oxypropylene and/or oxybutylene.

The morpholino-bearing Q groups of the Y and M'' units of the polymers of this invention are bonded to silicon by an Si—C bond when, in the formula for Q, $q$ is zero and $p$ is either zero or one. Such copolymers are prepared by the method, referred to herein as Method C, which overall comprises reaction of: (a) equilibrated polyalkylsiloxane hydrides; (b) the respective alkenyl-endblocked or hydroxyl-terminated polyether reactants shown in equations 1 and 2; and (c) N-alkenyl-morpholines having the formula,

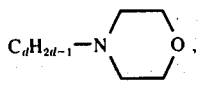

or N-[(alkenyloxy)alkyl]morpholines having the formula,

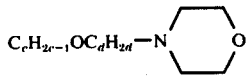

including corresponding reactants in which the morpholino nucleus is substituted with lower alkyls (that is, the $C_1$ to $C_4$ alkyls encompassed by $R^1$, $R^2$, $R^3$ and $R^4$ of the formula for Q). In such unsaturated morpholine reactants, $c$ and $d$ are as previously defined in expressing the bivalent alkylene radicals, —R'— and —R''—, of Q as —$C_eH_{2c}$— and —$C_dH_{2d}$—, respectively. Thus, in each instance, $c$ is an integer from 2 to 4 and $d$ is an integer from 2 to 6.

In accordance with one embodiment of Method C, morpholinoalkyl- and morpholinoalkoxyalkyl-substituted copolymers of the invention in which the bonds between silicon and the polyoxyalkylene blocks are also Si—C, are provided by the concurrent hydrosilation of the above-described alkenyl-endblocked polyether and unsaturated morpholine reactants. This embodiment is illustrated by the following equations 3 and 4, respectively:

Equation 3:

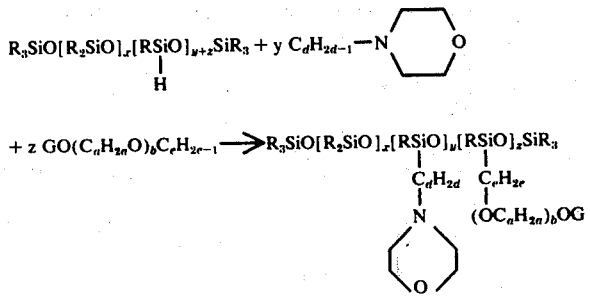

Equation 4:

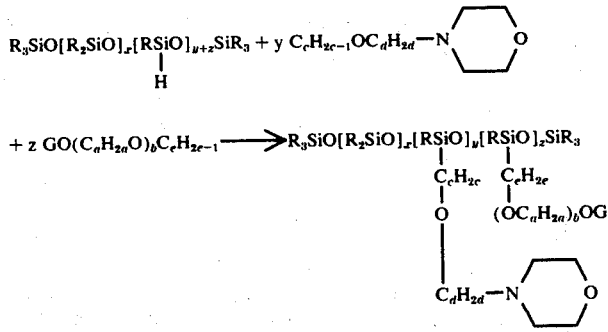

It is to be understood that the reactions of equations 3 and 4 may also be carried out by first hydrosilating $z$ moles of the polyether reactant to provide an intermediate having the average composition,

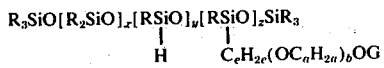

which is then reacted with $y$ moles of the unsaturated morpholine reactant to provide the respective products shown in equations 3 and 4.

In accordance with still another embodiment of Method C, the equilibrated polyalkylsiloxane hydride fluid shown in equations 3 and 4 is reacted initially with $y$ moles of the respective unsaturated morpholine reactants followed by reaction of the intermediate morpholinoalkyl- and morpholinoalkoxyalkyl-modified polyalkylsiloxane hydrides with $z$ moles of either the monoolefinically unsaturated polyether reactant shown in equation 1 or the hydroxyl-terminated polyether reactant shown in equation 2. This sequence of reactions is illustrated by equations 5a–5c wherein allyl morpholine is shown as the morpholino-bearing reactant:

Equation 5a:

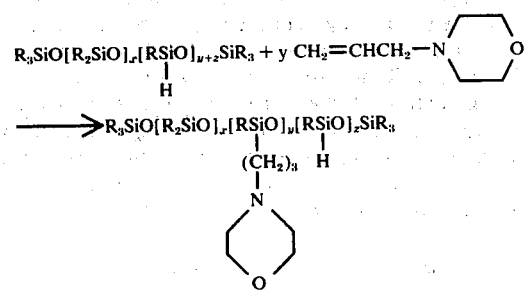

Equation 5b:

Product of Equation 5a + z $GO(C_nH_{2n}O)_bC_eH_{2e-1}$

-continued

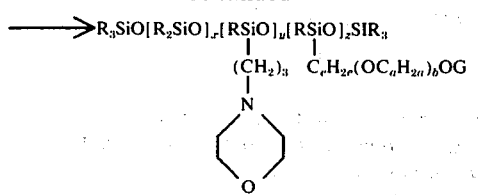

Equation 5c:

Product of Equation 5a + z G(OC$_a$H$_{2a}$)$_b$—OH

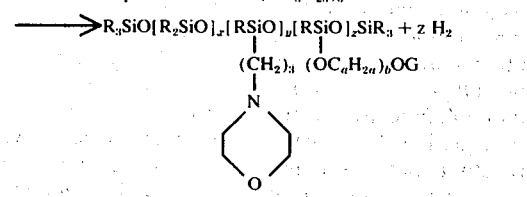

wherein R, G, a, b, e, x, y and z are as previously defined. When R is methyl and the polyether reactants are GO(C$_3$H$_6$O)$_m$(C$_2$H$_4$O)$_n$CH$_2$CH=CH$_2$ and GO(C$_2$H$_4$O)$_b$—H, the polymer products of equations 5b and 5c have the average compositions shown hereinabove by Formula VI (wherein r is one and e is three) and Formula VIII (wherein r is zero), respectively.

Application of the partial hydrosilation reaction of equation 5a to N-[(2-allyloxy)propyl]morpholine in place of N-allylmorpholine provides morpholinoalkoxyalkyl-modified polyalkylsiloxane hydrides having the average composition,

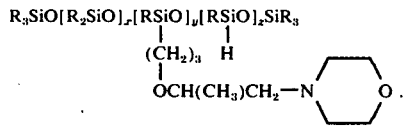

When R is methyl and such Q-modified hydrides are reacted with z moles of GO(C$_3$H$_6$O)$_m$(C$_2$H$_4$O)$_n$CH$_2$CH=CH$_2$ by the hydrosilation reaction illustrated by equation 5b, the copolymer products have the average composition defined by Formula VII in which r is one and e is three. Likewise, when R is methyl and such 3-(morpholinoisopropoxy)propyl-modified polymethylsiloxane hydrides are reacted with z moles of GO(C$_2$H$_4$O)$_b$—H by the condensation reaction illustrated by equation 5c, the copolymer products have the average composition defined by Formula IX in which r is zero.

The morpholino-substituted Q groups of the Y and M″ units of the polymers of this invention are bonded to silicon by an Si—O bond when, in the formula for Q, q is one. Such copolymers are prepared by the method, referred to herein as Method D, which overall comprises reaction of (1) equilibrated polyalkylsiloxane hydrides, (2) the respective alkenyl-endblocked or hydroxyl-terminated polyether reactants shown in equation 1 and 2, and (3) at least one of the following types of hydroxyl-substituted morpholine reactants:

a. N-(hydroxyalkyl)morpholines having the formula,

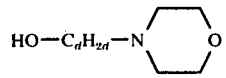

b. N-[(hydroxyalkoxy)alkyl]morpholines having the formula,

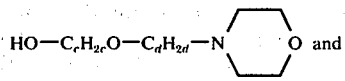 and c. N-[hydroxypoly(alkyleneoxy)alkyl]morpholines having the formula,

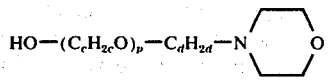

including corresponding reactants in which the morpholino nucleus is substituted with lower alkyls (that is, the C$_1$ to C$_4$ alkyls encompassed by R$^1$, R$^2$, R$^3$ and R$^4$ of the formula for Q). In the above types of hydroxyl-substituted morpholine reactants, c and d are also as previously defined in expressing the bivalent alkylene radicals, —R′— and —R″—, of Q as —C$_c$H$_{2c}$— and —C$_d$H$_{2d}$—, respectively, and thus c has a value from 2 to 4 and d is from 2 to 6. In above reactant (c), p has an average value greater than one and up to about four.

Common to the various embodiments of Method D is hydrogen condensation of Si—H of the equilibrated polyalkylsiloxane hydride reactant and HO—C of the hydroxyl-substituted morpholine reactant. In accordance with one embodiment of Method D, the said condensation reaction is carried out concurrently with hydrogen condensation of Si—H of the polyalkylsiloxane hydride and HO—C of the above-described hydroxyl-terminated polyethers. This embodiment is illustrated by the following equation 6 in which the formula for the morpholine reactant encompasses hydroxyl-substituted morpholine reactants (a), (b) and (c) above.

Equation 6:

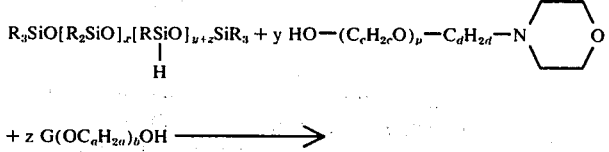

+ z G(OC$_a$H$_{2a}$)$_b$OH ⟶

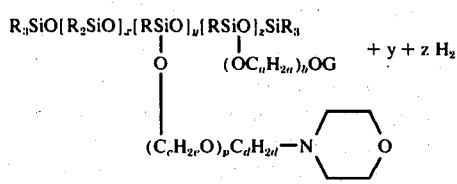

$+ y + z H_2$ wherein: R, G, $a$, $b$, $c$, $d$, $x$, $y$ and $z$ have the significance previously defined herein and, as also previously defined, $p$ is zero or a number having an average value from about one to about four. It is to be understood that the reaction of equation 6 may also be carried out by first reacting $z$ moles of the polyether reactant with the polyalkylsiloxane hydride to provide an intermediate having the average composition,

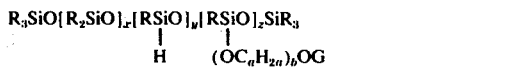

which is then reacted with $y$ moles of the hydroxyl-substituted morpholine reactant to provide the polymer product shown in equation 6. In accordance with another embodiment of Method D, the polyalkylsiloxane hydride is partially reacted initially with $y$ moles of the morpholine reactant to provide an intermediate having the average composition,

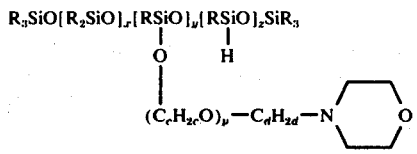

which is then reacted with $z$ moles of either the alkenyl-endblocked polyether reactant shown in equation 1 or the hydroxyl-terminated polyether reactant shown in equation 2. This sequence of reactions is illustrated by the following equations 7a–7c in which the morpholine reactant is shown as N-[2-(2-hydroxyethoxy)ethyl]-morpholine.

Equation 7a:

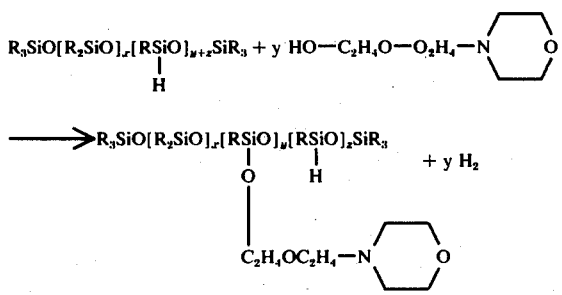

Equation 7b:

Product of Equation 7a $+ z$ GO($C_aH_{2a}O$)$_b$$C_eH_{2e-1}$

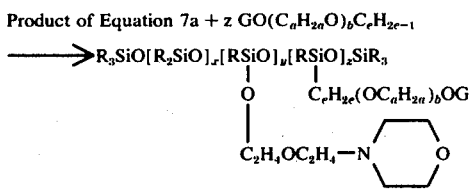

Equation 7c:

Product of Equation 7a $+ z$ G(O$C_aH_{2a}$)$_b$—OH

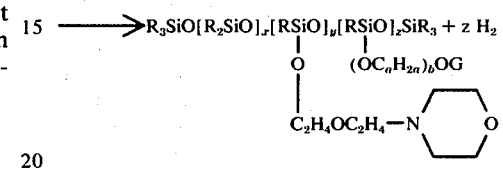

wherein R, G, $a$, $b$, $e$, $x$, $y$ and $z$ are as previously defined.

The hydrosilation reactions illustrated by equations 1, 1a, 3, 4, 5a, 5b and 7b, which overall comprise the addition of Si—H to the respective alkenyl groups of the polyether and morpholine reactants, are effected in the presence of a platinum catalyst. Particularly effective is platinum in the form of chloroplatinic acid dissolved, if desired, in a solvent such as tetrahydrofuran, ethanol, butanol, 1,2-dimethoxyethane or mixed solvents such as ethanol/1,2-dimethoxyethane. It is to be understood, however, that other platinum derivatives known to the art as hydrosilation catalysts may also be used. For example, also suitable as promoters of the hydrosilation reaction are the platinum catalysts prepared by reaction of chloroplatinic acid and an alcohol such as octanol as described in U.S. Pat. No. 3,220,972. The platinum is present in a catalytic amount such as, for example, from about 5 to about 400 parts by weight per million (p.p.m.) parts of the combined weight of the silicon-containing and organic reactants. The more usual platinum concentration is no more than about 200 p.p.m. Suitable reaction temperatures range from about room temperature (20° C.) to about 200° C., and are more usually from about 60° C. to about 160° C.

The condensation reactions illustrated by equations 2, 2a, 5c, 6, 7a and 7c which overall comprise the reaction of silanic hydrogen (Si—H) and hydrogen of the —OH groups of the hydroxyl-terminated polyether reactant and the hydroxyl-substituted morpholine reactant, are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight percent, based on the total weight of the reactants. The Si—H/HO—C condensation reactions are effected at temperatures from about 60° C. to about 150° C., and more usually from about 80° C. to about 120° C.

The various reactions of equations 1 through 7c are carried out employing the respective organic reactants (that is, the polyether and morpholino-substituted compound) in amounts at least sufficient to react with a predetermined proportion of the silicon-bonded hydrogen of the Si—H reactant. From the standpoint of more effective and more complete reaction of silanic hydrogen, the organic reactants are usually employed in excess of stoichiometric requirements. In the reactions wherein the Si—H groups are to be completely reacted with only one of the organic reactants to form the desired final polymer such as the reactions illustrated by equations 1, 1a, 2, 2a, 5b, 5c, 7b and 7c, the organic reactant may be employed in amounts up to a 100 or more mole percent excess. When the Si—H reactant is either partially reacted initially with one of the organic reactants as shown, for example, by equations 5a and 7a, or is reacted with the organic reactants concurrently as shown in equations 3, 4 and 6, the organic reactants are employed in an amount at least sufficient to substantially satisfy the predetermined stoichiometric requirements of the desired reaction, up to about 100 mole percent in excess of the desired stoichiometry. In such operation usually no more than about a 50 mole percent excess of each reactant is required to obtain substantially complete reaction of the silanic hydrogen.

The hydrosilation and condensation reactions may be conducted in the absence or presence of a solvent. Illustrative solvents are any of the following employed individually or in combination with one another: the normally liquid aromatic hydrocarbons such as benzene, toluene and xylene; alcohols such as n-propanol and isopropanol; ethers; ether alcohols; and other such non polar or polar solvents. Upon completion of the respective hydrosilation and condensation reactions, excess reactant and any organic solvent employed in the polymer preparation, may be removed by conventional separation techniques to obtain the final product comprising the polymer compositions of the invention. It is to be understood, however, that some portion or all of the solvent and excess reactants including by-products thereof and the polyether reactant may remain in the product and that such diluted polymer compositions are within the scope and may be used in accordance with the teachings of this invention. In the hydrosilation reactions, the removal or neutralization of the platinum catalyst is usually desirable for long range product stability. Neutralization is readily effected by adding sodium bicarbonate to the reaction mixture followed by filtration of the resultant slurry to remove the neutralizing agent and platinum residues.

The polyalkylsiloxane hydrides employed in the reactions of equations 3, 4, 5a, 6 and 7a are in turn provided by conventional equilibration reactions. Overall such methods comprise the use of various combinations of the precursor reactants described below as the source of the indicated siloxy units.

a. Hexaalkyldisiloxanes, $R_3SiOSiR_3$, as the source of the endblocking units, $R_3SiO_{1/2}$.

b. Cyclic dialkylsiloxane polymers, $[R_2SiO]_h$, where $h$ usually has an average value of from about 3 to about 6, as the source of the difunctional dialkylsiloxy units (X), $R_2SiO_{2/2}$, when such X units are to be incorporated, that is, when $x$ of Formula II, for example, is a positive number.

c. Trialkyl-endblocked dialkylsiloxane polymers, $R_3SiO(R_2SiO)_wSiR_3$, where $w$ has an average value of at least two and is usually no more than about 10, as the source of the endblocking units, $R_3SiO_{1/2}$, and as a source of the dialkylsiloxy units (X), $R_2SiO_{2/2}$, when the latter units are to be incorporated.

d. Polymeric alkylsiloxane hydride fluids having an Si—H content sufficient to provide from about 200 to about 372 cubic centimeters of hydrogen per gram, as the source of the $(H)(R)SiO_{2/2}$ units. The above reactants $(a)-(d)$ or subcombination thereof such as $(a)$, $(b)$ and $(d)$ are reacted in relative proportions predetermined to provide an Si—H reactant in which the average value of $x$ corresponds to the average number of X units desired in the final Q-modified copolymer, and in which the average number of total $(H)(R)SiO_{2/2}$ units corresponds to the combined total average number of Q-modified Y units $(y)$ and E-substituted Z units $(z)$ desired in the copolymer product. The Q-modified copolymers of the invention which are endblocked by M′ or M″ units [that is, $(E)(R)_2SiO_{1/2}$ and $(Q)(R)_2SiO_{1/2}$, respectively] are provided by the employment of corresponding $(H)(R)_2SiO_{1/2}$-endblocked polyalkylsiloxane hydrides in the above-described hydrosilation and condensation reactions. Such Si—H reactants are in turn provided by effecting the equilibration in the presence of dihydrogentetraalkylsiloxanes $[(H)(R)_2SiOSi(R)_2(H)]$ in place of above-described reactants $(a)$ and $(c)$.

Suitable promoters of these various equilibration reactions are acidic catalysts such as trifluoromethylsulfonic acid ($CF_3SO_3H$) and concentrated (93–98 weight percent) sulfuric acid. The catalyst is usually employed in a concentration of from about 0.1 to about four weight percent, based on the total weight of reactants. The acid-catalyzed equilibration reactions are usually carried out with stirring at temperatures within the range from about 20° C. to about 120° C. at least until the reaction mixture becomes homogeneous. Effecting the reaction at temperatures from about 20° C. to about 50° C. usually provides a satisfactory rate of reaction. After completion of the reaction, the reaction product is neutralized with base such as sodium bicarbonate and filtered, sometimes adding a liquid hydrocarbon such as xylene or toluene or a filter aid to facilitate the filtration. When a diluent is used, it is conveniently separated from the reaction product by rotary vacuum evaporation.

The morpholino-modified polysiloxane-polyoxyalkylene copolymers of this invention are generally useful as surfactants and find particular application in the manufacture of urethane foam. The normally liquid copolymers can be used as such, for stabilization of urethane foam without the need for combination with other surfactants or other type of organic additive. The polymers can be employed as a 100 percent active stream, or they can be employed in dilute form as a solution in polar solvents (e.g., glycols) or non polar organic solvents such as normally liquid aliphatic and aromatic unsubstituted and halogen-substituted hydrocarbons (e.g., heptane, xylene, toluene, chlorobenzenes and the like).

Preferred diluents, particularly for use in combination with the copolymers intended for use as stabilizers of polyether polyol-derived urethane foam are poly(oxyalkylene) compounds encompassed by the formula,

wherein:

D — is hydrogen or a monovalent hydrocarbon group including alkyl (e.g., methyl, ethyl, propyl and butyl), aryl (e.g., phenyl and tolyl) and aralkyl (e.g., benzyl) groups;

D' — is a bivalent alkylene group (e.g., ethylene, propylene, trimethylene and butylene);

D" — is a monovalent hydrocarbon group such as defined for D; and $t°$ — has an average value of at least two.

When D is hydrogen, it is preferred that such DO— (that is, hydroxyl) groups constitute no more than about 5 weight percent of the solvent. Generally suitable solvents are alkylene oxide adducts of starters such as water, mono-ols, diols and other polyols, of which the organic starters are preferred. Such organic starters are typically illustrated by butanol, propylene glycol, glycerol and 1,2,6-hexanetriol. Preferred adducts of the organic starters are the mixed alkylene oxide adducts, particularly those containing a combination of oxyethylene and oxypropylene units. For example, one class of such organic solvents which may be present in combination with the copolymers of this invention are mixed ethylene oxide-propylene oxide adducts of butanol having the general formula, $HO(C_2H_4O)_{u°} \cdot (C_3H_6O)_{v°} \cdot C_4H_9$, wherein $u°$ has an average value from about 8 to about 50, and $v°$ has an average value from about 6 to about 40. Preferably, the values of $u°$ and $v°$ are such that the weight percent of oxyethylene units is substantially the same as the weight percent of the oxypropylene units. When used, the aforesaid diluents are usually present in the solution in an amount from about one to about 60, and more usually from about 5 to about 45, weight percent, based on the total weight of the morpholino-modified copolymer contained in the solution. It is to be understood, however, that such solutions may have higher contents of diluent and that the extent of dilution, if any, depends largely on the activity specifications of any given foam formulation.

In regard to the morpholino-modified copolymers of the invention intended for use as stabilizers of polyester polyol-derived foam, it is often desirable to employ them in solution in combination with an organic acidic component, a water soluble organic surfactant and/or a water soluble glycol. The morpholino-bearing copolymers of the present invention may be present in such solutions in an amount from about 10 to about 80 parts by weight per 100 parts by weight of the solution. Suitable organic acidic components, organic surfactants and glycols for this purpose are as described in U.S. Pat. No. 3,793,360 (particularly at column 17, beginning with line 54 through column 18) the teachings of which in this regard are incorporated as part of the present disclosure by reference thereto.

In addition to the morpholino-substituted polysiloxane-polyoxyalkylene copolymers, the other essential types of components and reactants employed in the production of flexible urethane foam in accordance with the process of this invention are polyether or polyester polyols, organic polyisocyanates, an amine catalyst and blowing agent. When producing flame-retarded foams, the foam-producing reaction mixtures also contain a flame-retardant. The amount of organosilicone polymers of this invention present in the final foam-producing reaction mixture may vary over a relatively wide range such as from about 0.1 to about 5 parts by weight per 100 parts by weight of the polyol reactant, and are usually present in an amount of at least about 0.2 and no more than about 3 parts.

In producing the polyether polyol-based urethanes of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Among the suitable polyether polyols that can be employed are the poly(oxyalkylene) polyols, that is, alkylene oxide adducts of water or a polyhydric organic compound as the initiator or starter. For convenience, this class of polyether polyols is referred to herein as Polyol I. Illustrative of suitable polyhydric organic initiators are any one of the following which may be employed individually or in combination: ethylene glycol; diethylene glycol; propylene glycol; 1,5-pentanediol; hexylene glycol; dipropylene glycol; trimethylene glycol; 1,2-cyclohexanediol; 3-cyclohexene-1,1-dimethanol and the 3,4-dibromo-derivative thereof; glycerol; 1,2,6-hexanetriol; 1,1,1-trimethylolethane; 1,1,1-trimethylolpropane; 3-(2-hydroxyethoxy)- and 3-(2-hydroxypropoxy)-1,2-propanediols; 2,4-dimethyl-2-(2-hydroxyethoxy)methylpentanediol-1,5; 1,1,1-tris[(2-hydroxyethoxy)methyl]ethane; 1,1,1-tris[(2-hydroxypropoxy)methyl]propane; pentaerythritol; sorbitol; sucrose; alpha-methyl glucoside; other such polyhydric compounds consisting of carbon, hydrogen and oxygen and having usually not more than about 15 carbon atoms per molecule; and lower alkylene oxide adducts of any of the aforesaid initiators such as propylene oxide and/or ethylene oxide adducts having a relatively low average molecular weight up to about 800.

The above-described polyether polyols are normally liquid materials and, in general, are prepared in accordance with well known techniques comprising the reaction of the polyhydric starter and an alkylene oxide in the presence of an oxyalkylation catalyst which is usually an alkali metal hydroxide such as, in particular, potassium hydroxide. The oxyalkylation of the polyhydric initiator is carried out at temperatures ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein

OH = hydroxyl number of the polyol, $f$ = average functionality, that is, the average number of hydroxyl groups per molecule of polyol, and M.W. = average molecular weight of the polyol.

The alkylene oxides usually employed in providing the polyether polyol reactants are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyether polyols that are suitable for use in preparing polyurethane foams of the present invention are polymer/polyether polyols which, for convenience, are referred to herein as Polyol II. Such reactants are produced by polymerizing one or more ethylenically unsaturated monomers dissolved or dispersed in a polyether polyol in the presence of a free radical catalyst. Suitable polyether polyols for producing such compositions include, for example, any of the above-described polyols encompassed by the definition of Polyol I. Illustrative of suitable ethylenically unsaturated monomers are those encompassed by the formula,

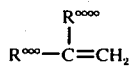

where: $R^{\circ\circ\circ}$ is hydrogen, methyl or any of the halogens (i.e., fluorine, chlorine, bromine or iodine); and $R^{\circ\circ\circ\circ}$ is $R^{\circ\circ\circ}$, cyano, phenyl, methyl-substituted phenyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, and butadiene. These and other polymer/polyol compositions which are suitably employed either individually or in combination with Polyol I are those described in British Pat. No. 1,063,222 and U.S. Pat. No. 3,383,351, the disclosures of which are incorporated herein by reference thereto. Such compositions are prepared by polymerizing the monomers in the polyol at a temperature between about 40° C. and about 150° C. employing any free radical-generating initiator including peroxides, persulfates, percarbonates, perborates and azo compounds. Such initiators are illustrated by hydrogen peroxide, dibenzoyl peroxide, benzoyl hydroperoxide, lauroyl peroxide, and azobis-(isobutyronitrile). The polymer/polyether polyol product may also contain a small amount of unreacted polyether, monomer and free polymer.

When used in the practice of this invention, the polymer/polyol compositions usually contain from about 5 to about 50, and more usually from about 10 to about 40, weight percent of the ethylenically unsaturated monomer polymerized in the polyether polyol. Especially suitable polymer/polyols are those containing:

A. from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of (1) and (2), respectively; and B. from about 90 to about 70 weight percent of the polyether polyol, and particularly trifunctional polyols such as alkylene oxide adducts of glycerol.

In preparing polyurethane foams in accordance with the present invention, it is to be understood that mixtures of any of the aforesaid polyether polyols encompassed by Polyol I and Polyol II can be employed as reactants with the organic polyisocyanate. The particular polyether polyol or polyols employed depends upon the end-use of the polyurethane foam. Usually diols provide soft foams. Firmer foams are obtained by the incorporation of polyether polyols having more than two hydroxyl groups, including triols, tetraols, pentols and hexols. When it is desired to produce polyurethanes having comparatively high load-bearing properties and/or diecutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 28 to about 150, and is usually no higher than about 80.

The polyester polyols employed in producing urethane foams in accordance with the method of this invention are the reaction products of: (1) a polyfunctional organic carboxylic acid, and (2) one or more of the aforesaid polyether polyols or one or more of the aforesaid polyhydric organic initiators which are reacted with alkylene oxide to produce such polyether polyols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers (defined as above) from about 25 to about 150, and preferably have hydroxyl numbers between about 40 and about 80. Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The organic polyisocyanates that are useful in producing flexible polyether and polyester urethane foam in accordance with the process of this invention are organic compounds that contain at least two isocyanato groups. Such compounds are well known in the art of producing polyurethane foams, and are conveniently represented by the general formula:

wherein: $i$ has an average value of at least two and is usually no more than six, and $Q'$ represents an aliphatic, cycloaliphatic or aromatic radical which can be an unsubstituted hydrocarbyl group or a hydrocarbyl group substituted, for example, with halogen or alkoxy. For example, $Q'$ can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4- isocyanatophenyl)methane; 4-methoxy-1,4-phenylenediisocyanate; 4-chloro-1,3-phenylenediisocyantate; 4-bromo-1,3-phenylenediisocyanate; 5,6-diemthyl-1,3-phenylenediisocyanate; 2,4-tolylene diisocyanate; 2,6-tolyene diisocyanate; mixtures of the 2,4- and 2,6-tolylene diisocyanates; crude tolylene diisocyanates; 6-isopropyl-1,3-phenylenediisocyanate; durylene diisocyanate; triphenylmethane-4,4',4''-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

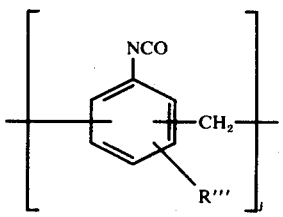

wherein R''' is hydrogen and/or lower alkyl and j has an average value of at least 2.1. Preferably the lower alkyl radical is methyl and j has an average value of from 2.1 to about 3.2. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially (e.g., NIAX Isocyanate AFPI), and are low viscosity (50–500 centipoises at 25° C.) liquids having average isocyanato functionalities between about 2.25 and about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesid polyphenylmethylene polyisocyanates and/or polymeric tolylene diisocyanates obtained as residues from the manufacture of the diisocyanates.

On a combined basis, the polyether or polyester polyol and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from about 0.8 to about 1.5, preferably from about 0.9 to about 1.2, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from about 80 to about 150, and is preferably within the range from about 90 to about 90 to about 120.

The urethane-forming reaction is effected in the presence of a minor amount of a catalyst comprising an amine. This component of the polyurethane-forming reaction mixture is usually a tertiary-amine. Suitable amine catalysts include one or more of the following: N-methylmorpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-diemethylethanolamine; triisopropanolamine; N-methyldiethanolamine; hexadecyldimethylamine; N,N-dimethylbenzylamine; trimethylamine; N,N-diemthyl-2-(2-dimethylaminoethyoxy)ethylamine, also known as bis(2-dimethylaminoethyl)ether; triethylenediamine (i.e., 1,4diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the beta-tertiary amino amides and esters described in U.S. Pat. No. 3,821,131, as exemplified by 3-(N,N-dimethylamino)-N',N'-dimethylpropionamide. Also useful as the amine catalyst are the beta-tertiary-amino nitriles described in copending application Ser. No. 369,556, filed June 13, 1973, now U.S. Pat. No. 3,925,268 of W. R. Rosemund, M. R. Sandner and D. J. Trecker, such as, in particular, 3-(N,N-dimethylamino)propionitrile as such or in combination with other tertiary amines such as bis[2-(N,N-dimethylamino)ethyl]ether. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in a catalytic amount such as from about 0.05 to about 8 parts by weight of active catalyst (that is, the amine exclusive of other components present in solutions thereof) per 100 parts by weight of the polyol reactant. In forming polyether polyol urethane foam, the amine catalyst concentration is usually no higher than about 3 parts. In forming polyester polyol urethane foam, the preferred concentration of total amine catalyst is at least about 0.2 up to about 8 parts, although more than about 5 parts is usually not required.

In producing polyurethanes from polyether polyols usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant. Although such metal catalysts are suitably employed in the preparation of polyether polyol urethane foam, their use is generally avoided in the manufacture of foam derived from a polyester polyol.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromethane, -dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane.

The amount of blowing agent employed will vary with factors such as the desired density of the foamed product. Usually, however, from about 1 to about 30 parts by weight of the blowing agent per 100 parts by weight of the polyol reactant is preferred. Foam densities may be within the range from about 0.8 to about 5 pounds per cubic foot (pcf). Polyurethane foam of relatively low density such as 2 pcf and less is usually prepared employing blowing agent comprising water in an amount of at least about 3 parts by weight per 100 parts by weight of polyol reactant, whereas higher density foam is provided at lower levels of water with and without the use of an auxiliary fluorocarbon blowing agent. It is to be understood, however, that these are general guidelines and that the choice of the particular amount of blowing agent employed to obtain a desired foam density specification varies from formulation to formulation and is well within the skill of the art to which the present invention pertains.

The flame retardants that can be employed in producing flame-retarded urethane foam in accordance with the teachings of this invention can be chemically combined in one or more of the other materials used (e.g., in the polyol or polyisocyanate), or they can be used as discrete chemical compounds added as such to the foam formulation. The organic flame-retardants usually contain phosphorus or halogen, both phosphorous and halogen, or phosphorus and nitrogen. Usually, the halogen, when present, is chlorine and/or bromine. Flame-retardants of the discrete chemical variety include: 2,2-bis(bromomethyl)-1,3-propanediol (also known as dibromonepentyl glycol); 2,3-dibromopropanol; tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorenadate; chlorinated maleic anhydride; tris(2-chloroethyl)phosphate [(ClCH$_2$CH$_2$O)$_3$P(O)]; tris(2,3-dibromopropyl)phosphate; tris(2,3-dichloropropyl)phosphate; tris(1-bromo-3-chloroisopropyl)phosphate; bis(2,3-dibromopropyl)phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate; and O,O-diethyl-N,N-bis(2-hydroxyethyl)aminomethyl phosphonate. Also suitable are compounds having the formulas:

$$(ClCH_2)_2C[CH_2OP(OCH_2CH_2Cl)_2]_2 \text{ and}$$

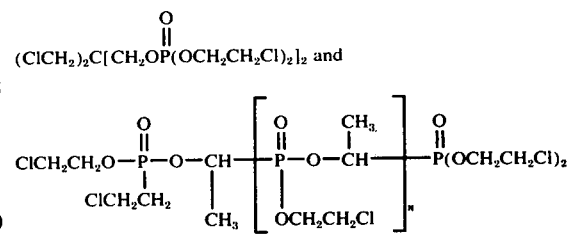

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927 3,075,928; 3,222,305; and 3,574,149. Illustrative of suitable inorganic phosphorus-containing flame-retardants is the ammonium polyphosphate available from Monsanto Chemical Company under the name Phoscheck P30. The latter is especially useful as a flame-retardant for polyester urethane foam. It is to be understood that other flame-retardants known to the art may be used and that the aforesaid compounds may be employed individually or in combination with one another.

Of the above flame-retardants, those of the discrete chemical compound variety which contain groups reactive with hydroxyl or isocyanato groups can be used as reactants in producing the polyether polyol or polyester polyol or they can be reacted with organic polyisocyanates, to produce corresponding modified polyols or polyisocyanates having chemically combined flame-retarding groups. Such modified polyols and polyisocyanates are also useful as reactants in the process of this invention. In such cases, due regard must be given to the possible effect of the functionality of the compound on the other properties (e.g., degree of flexiblity) of the resulting foam.

The flame-retarding agent can be present in the foam formulations described herein in an amount from about 1 to about 30 parts by weight per one hundred parts by weight of the polyol reactant. Usually the flame-retardant is employed in an amount of at least about 5 parts by weight per 100 parts by weight of polyol. As will be evident to those having skill in the art, the particular amount of flame-retardant employed depends largely on the efficiency of any given agent in reducing flammability of polyurethane foam.

The polyurethane foams may be formed in accordance with any of the processing techniques known to the ar. Usually the "one-shot" process is used. In this method, the polyol and polyisocyanate reactants are independently added to the foam-producing reaction mixture and the —OH/—NCO reaction is effected simultaneously with the foaming operation. It is often convenient to add the foam stabilizing component comprising the morpholino-bearing polysiloxane-polyoxyalkylene copolymers of the present invention to the reaction mixture as a premixture with one or more of the blowing agent, polyol, amine catalyst and, when used, the flame-retardant. The foaming and urethane-forming reactions occur without the application of external heat. Often the resulting foam is cured by heating the foam at a temperature between about 100° C. and about 150° C. for about 5 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing flexible urethane foams are not narrowly critical. The polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, catalyst and the foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the morpholino-modified copolymers of this invention are present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. Illustrative of such additives are: cross-linking agents such as glycerol, triethanolamine and their oxyalkylene adducts; compression set additives (e.g., hexylene glycol); additives to regulate cell structure so as to coarsen cells and thereby reduce the tendency of the foam to split (e.g., paraffin oil); fillers; dyes; pigments; and, particularly in regard to polyester polyol-ferived foam, anti-discoloration additives including anti-scorch and anti-oxidation agents such as phenols substituted with tertiarybutyl groups as exemplified by 2,6-di-tert-butyl-4-methylphenol ("Ionol"), oxirane-containing compounds (e.g., propylene oxide), triorgano- (e.g., triphenyl-) substituted phosphites and phospines, and other anti-discoloration additives known to the art.

The flexible urethane foams produced in accordance with this invention can be used in the same areas as conventional polyether and polyester urethane foams, the flame-retarded products being especially useful where reduced combustibility properties are beneficial. Thus, the foam products are useful as textile interliners, cushioning materials for seating and mattresses, for packaging of delicate objects, as gasketing materials, and the like.

The following examples are merely illustrative of the present invention and are not intended as a limitation upon the scope thereof.

It is to be understood that in the formulas included in the data which follows, "Me" designates methyl (—CH$_3$).

The morpholino-modified surfactants described in the examples were prepared from equilibrated polymethylsiloxane hydrides having the average composition,

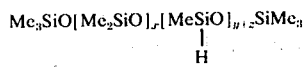

Unless indicated otherwise, the average values of $x$ and $y+z$ are based on the relative proportions of starting materials employed in providing such Si—H rectants, normalized to two moles of the monofunctional units. With reference to such Si—H reactants, the theoretical weight percent of Me(H)SiO contained therein corresponds to the weight [60 $(y+z)$] contributed by Me(H)SiO divided by the calculated molecular weight of the equilibrated product times 100. The found weight percent of Me(H)SiO is derived from the Si—H analysis of the equilibrated product in accordance with the conversion:

$$\text{Weight Percent Me(H)SiO Found} = \frac{\text{cc. H}_2 \text{ per gram} \times 100}{373.3}$$

where the factor 373.3 is the theoretical number of cubic centimeters of hydrogen provided per gram of fluid consisting of 100 percent Me(H)SiO (that is, 22,400 cc. of hydrogen divided by the unit molecular weight of 60).

With reference to the foam data of the examples and control runs, the following terms have the indicated significance:

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, "Journal of Cellular Plastics" (January, 1965). In accordance with this test, breathability is measured as follows: A 2 inch × 2 inch × 1 inch piece of foam is cut from near the center of the bun. Using a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM).

"CPI" denotes "cells per inch", that is, the number of cells per linear inch of the foam. CPI is directly proportional to the fineness of the cell structure.

"Burning Extent" was determined in accordance with standard flammability test procedure ASTM D-1692–68 except that five test specimens of foam were used instead of ten. Burning extent denotes the burned length (in inches) of the foam and is reported as the average of the results obtained with the various test specimens of a given foam. On the basis of this test, an average burning extent of less than 5.0 inches qualifies the foam for a self-extinguishing ("SE") rating. When the burning extent of at least one test specimen is 5.0 inches or greater, the foam is assigned a burning ("B") rating and usually no further specimens of that foam are tested.

"Burning Time" denotes the average time (in seconds) taken to give the specified burning extent.

EXAMPLE 1

This example describes an illustrative 3-(morpholino)propyl-modified polymethylsiloxane-polyoxyethylene copolymer of the invention, designated Surfactant A.

A. Preparation of Si—H Fluid I

To a one-liter capacity three-necked reaction flask fitted with a mechanical stirrer, thermometer and nitrogen blow-by, the following reactants and catalyst were added: (1) hexamethyldisiloxane, $Me_3SiOSiMe_3$, in an amount of 64.95 grams (0.4 mole) corresponding to 0.8 mole of $Me_3SiO_{1/2}$; (2) polymeric methylsiloxane hydride in an amount of 288.6 grams, corresponding to 4.8 moles of $Me(H)SiO_{2/2}$; (3) cyclic dimethylsiloxane tetramer in an amount of 148.3 grams, corresponding to 2 moles of $Me_2SiO_{2/2}$; and (4) concentrated sulfuric acid catalyst in an amount of 6 grams. The reaction mixture was stirred at room temperature for about 24 hours. The equilibrated reaction mixture was then neutralized with excess sodium bicarbonate and, after stirring for one hour, the product was pressure filtered. Based upon the relative proportions of reactants (1)–(3), normalized on the basis of two moles of $Me_3SiO_{1/2}$, the average composition of the equilibrated polymethylsiloxane hydride, referred to herein as Si—H Fluid I, is:

$$Me_3SiO[Me_2SiO]_3[\underset{H}{Me SiO}]_{12}SiMe_3$$

and the theoretical Me(H)SiO content is 57.5 weight percent. Analysis of the product for silanic hydrogen provided 212 cc. $H_2$/gram, corresponding to a found Me(H)SiO content of 56.8 weight percent.

B. Preparation of Surfactant A

In this preparation, a 500 ml. capacity reaction flask fitted with a mechanical stirrer, thermometer, nitrogen blow-by, distillation head and receiver, was charged with reactants (1)–(3), identified below.

1. Si—H Fluid I ($y+z=12$) in an amount of 30.1 grams (0.025 mole), corresponding to 0.3 mole-equivalent of Me(H)SiO.

2. Allyl morpholine in an amount of 19.84 grams (0.156 mole).

3. An allyl alcohol-started, methyl-capped polyoxyethylene ether having an allyl content of 9.8 weight percent on the basis of which the average molecular weight is about 418 and the average composition is, $CH_2\!=\!CHCH_2(OC_2H_4)_{7.8}OMe$. This polyether was used in an amount of 91.43 grams (about 0.219 mole). Also added were 58.7 grams of toluene and 100 p.p.m. of platinum catalyst as chloroplatinic acid. The respective amounts of reactants (2) and (3) include about 25 mole percent in excess of the desired stoichiometric reaction which was to effect reaction of (2) and (3) with the Si—H content of Si—H Fluid I in a mole ratio of 5:7, respectively. The reaction mixture was heated slowly to about 100° C. and after about 2 hours at that temperature, a standard test for residual Si—H yielded 3.4 cc. $H_2$/2 ml. sample Additional polyether reactant (9.1 grams) and catalyst were added and the reaction was heated overnight at 100° C. At the end of this period, residual Si—H had been reduced to 2 cc. $H_2$/2 ml. sample, indicating that the reaction had gone to about 96.9 percent completion. The liquid reaction product was neutralized with sodium bicarbonate and filtered. After removal of volatiles by vacuum stripping, the liquid product, designated herein as Surfactant A, had a Brookfield viscosity (at 25° C.) of 120 centipoise and an average molecular weight of 4000 (as determined by Gel Permeation Chromatography using a calibration curve based on dimethylsiloxane oils). As expressed on the normalized basis of two moles of trimethylsiloxy units and based on the aforesaid desired stoichiometry, Surfactant A comprises a copolymer to which the following average composition is assigned:

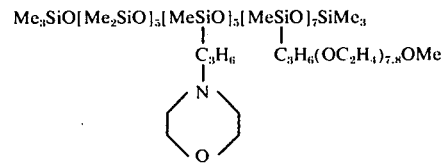

EXAMPLE 2

In accordance with this example, flame-retarded flexible polyester polyol-based urethane foam was prepared employing Surfactant A of Example 1 as the foam stabilizer. The foam formulation employed had the composition given in Table I which follows.

TABLE I

| Component | FOAM FORMULATION A Parts By Weight |
|---|---|
| Surfactant A | 0.35 |
| Polyester Polyol[1] | 100 |
| N-ethylmorpholine | 1.9 |
| Hexadecyldimethylamine | 0.3 |
| Water | 3.6 |
| Tolylene diisocyanate (Index 105)[2] | 45 |
| Tris(2-chloroethyl)phosphate | 7.0 |

[1]The polyester polyol employed was a commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 23° C. This particular polyester is known as "Witco Fomrez No. 50" (Witco Chemical Corporation.
[2]This component was a mixture of 2,4-Tolylene diisocyanate (80 weight percent and 2,6-tolylene diisocyanate. Index 105 means that the amount of mixture employed was 105 percent of the stoichiometric amount required to react with the polyester polyol and water present in the foam formulation.

The foam was prepared in accordance with the following procedure: The surfactant, amine catalysts and water were premixed in a 50 milliliter beaker. The polyester polyol reactant was weighed into a tared 32-ounce capacity container. The flame-retardant

[tris(2-chloroethyl)phosphate] and tolylene diisocyanate reactant were also weighed into the container and mixed with a spatula until homogeneous. Further mixing was done on a drill press equipped with a double three-bladed marine-type propeller about three inches in diameter. The mixing in the drill press was accomplished at 1000 revolutions per minute for eight seconds. Then the premixture of surfactant, catalyst and water was added and mixing was continued for seven additional seconds. The reaction mixture was poured into a 12 in. × 12 in. × 12 in. cardboard box, was allowed to rise and was then cured for about 30 minutes at 130° C. Samples of the foam product were prepared for physical and flammability property determinations.

A control foam (Run K-1) was also formed employing the components of Foam Formulation A and the above procedure except that in place of Surfactant A of the invention, the foam stabilizing component, referred to herein as Surfactant AA, was of the type described in U.S. Pat. No. 3,793,360 and two divisions thereof, namely, U.S. Pat. Nos. 3,793,300 and 3,833,512. Surfactant AA, which is an excellent stabilizer of flame-retarded flexible polyester urethane foam, is constituted of:

a. 52 weight percent of an organosilicone polymer containing $Me_3SiO_{1/2}$, $C_6H_5CH_2O(C_2H_4O)_{7.7}C_3H_6Si(Me)O_{2/2}$ and $SiO_{4/2}$ units in a mole ratio of 1:1:0.9, respectively;

b. 10.4 weight percent of a non ionic organic surfactant in which the hydrophobe is a mixture of $C_{11-15}$ alcohols and the hydrophile is ethylene oxide, the average number of oxyethylene units per mole of hydrophobe being nine;

c. 15.6 weight percent of tall oil; and d. 21 weight percent of hexylene glycol. In the control run, the relative proportions of ingredients of Foam Formulation A were as given in Table I except that Surfactant AA was present in an amount of one part per 100 parts by weight of the polyester polyol reactant, corresponding to 0.52 part of organosilicone polymeric component (a).

The results of these foam preparations are given in Table II which follows.

TABLE II

| Example | — | 2 |
|---|---|---|
| Control Run | K-1 | — |
| Surfactant | AA[1] | A[2] |
| Rise, inches | 6.0 | 5.8 |
| Breathability, SCFM | 1.5 | 1.2 |
| CPI | 45–50 | 50–55 |
| Density, lbs./ft.[3] | 1.91 | 2.03 |
| Burning extent, inches | 2.2 | 1.3 |
| Burning time, seconds | 48 | 28 |

[1]Not a surfactant of the invention.
[2]As described under Example 1.

From the data of Table II it is evident that the morpholinobearing polymethylsiloxane-polyoxyethylene copolymers encompassed by the present invention, as illustrated by Surfactant A allow for the formation of flame-retarded flexible polyester urethane foam of low burning extent (1.3 inches) without the need to incorporate inorganic silicate units ($SiO_{4/2}$) into the polymer network as in the case of control Surfactant AA.

EXAMPLE 3

In this example, a potency determination was made of Surfactant A using non-flame-retarded Foam Formulation B, identified in Table III.

TABLE III

| | FOAM FORMULATION B |
|---|---|
| Component | Parts By Weight |
| Surfactant A | 0.35 |
| Polyester polyol[1] | 100 |
| N-ethylmorpholine | 1.9 |
| Hexadecyldimethylamine | 0.3 |
| Water | 5.0 |
| Tolylene diisocyanate[2] | 59.4 |

[1] As identified in footnote 1 of Table I.
[2] As identified in footnote 2 of Table I.

As indicated, Foam Formulation B contains 5 parts by weight of water per 100 parts by weight of polyol reactant. The 5 parts water system is usually more difficult to stabilize than the more conventional formulations containing less water and thus provides a relatively sensitive test of potency. A control foam (Run K-2) was also made employing above-identified Surfactant AA at one part by weight per 100 parts of polyester polyol. The foams were prepared substantially following the above-described foaming procedure except that no flame-retardant was used. The results are given in Table IV which follows.

TABLE IV

| Example | — | 3 |
|---|---|---|
| Control Run | K-2 | — |
| Surfactant | AA[1] | A[2] |
| Rise, inches | 8.9 | 9.0 |
| Breathability, SCFM | 1.0 | 0.6 |
| Density, lbs./ft.[3] | 1.42 | 1.41 |
| CPI | 40–45 | 20–25 |
| Top Collapse, inches | None | None |

[1]Not a surfactant of the invention.
[2]As described under Example 1.

The results of Table IV demonstrate that illustrative Surfactant A of the invention also has excellent potency as a stabilizer of non flame-retarded polyester urethane foam.

EXAMPLE 4

This example describes the preparation of an illustrative 3-(morpholino)propyl-modified polymethylsiloxane-poly(oxyethylene-oxypropylene) copolymer of the invention, designated Surfactant B.

A. Preparation of Si—H Fluid II

The polymethylsiloxane hydride reactant employed in the preparation of Surfactant B was prepared by equilibration of a reaction mixture containing: (1) trimethylsiloxy endblocked dimethylsiloxy trimer, $Me_3SiO(Me_2SiO)_3SiMe_3$, in an amount of 38.4 grams (0.1 mole), corresponding to 0.2 mole of $Me_3SiO_{1/2}$ and 0.3 mole of $Me_2SiO_{2/2}$; (2) polymeric methylsiloxane hydride in an amount of 66.0 grams, corresponding to 1.1 moles of $Me(H)SiO_{2/2}$; (3) cyclic dimethylsiloxane tetramer in an amount of 458.8 grams, corresponding to 6.2 moles of $Me_2SiO_{2/2}$; and (4) 6.0 grams of concentrated sulfuric acid catalyst. The reaction mixture was stirred at room temperature overnight. The equilibrated reaction product was neutralized with excess sodium bicarbonate, treated with filter aid (Hyflo Super-Cel) and activated charcoal, followed by pressure filtration and vacuum stripping. The product weighed 503.3 grams. Based upon the relative proportions of reactants (1)–(3) normalized to two moles of $Me_3SiO_{1/2}$, the average composition of the equilibrated polymethylsiloxane hydride, referred to herein as Si—H Fluid II is:

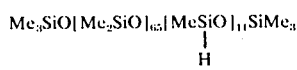

and the theoretical content of Me(H)SiO is 11.71 weight percent. Analysis of Si—H Fluid II for silanic hydrogen provided 43.4 cc. of hydrogen per gram, corresponding to a found Me(H)SiO content of 11.63 weight percent which is in substantial agreement with the theoretical value and the above average composition.

B. Preparation of Surfactant B

In this preparation, allylmorpholine and polyether reactant were reacted with Si—H Fluid II in excess of the desired stoichiometric reaction which was to react the Si—H content of Fluid II ($y+z = 11$) with allylmorpholine and polyether in a mole ratio of 5:6, respectively. The polyether reactant was an allyl alcohol-started, methyl-capped poly(oxyethylene-oxypropylene) copolymer which, upon analysis, showed the presence of 1.38 weight percent allyl. Based on this allyl content and an oxylkylene content constituted of about 40 weight percent oxyethylene, the average composition of the polyether reactant is taken as: $CH_2=CHCH_2(OC_2H_4)_{26.4}(OC_3H_6)_{30}OMe$. The polyether (111.5 grams; 0.0375 mole) was combined with toluene (120 ml.) and dried by heating until 25 ml. of aqueous toluene overhead was collected. To the polyether/toluene mixture there was then added 28.2 grams of Si—H Fluid II, corresponding to 0.055 mole-equivalent of Me(H)SiO. Additional toluene (30 ml.) was also added as well as about 0.3 ml. of a 4 weight percent solution of chloroplatinic acid in 1,2-dimethoxyethane. When the reaction mixture cleared, allylmorpholine (6.0 grams; about 0.05 mole) was added and heating was continued at about 100° C. The total reaction time was less than 1 hour. The standard test (KOH—$C_2H_5OH$—$H_2O$) for residual silanic hydrogen was nil. The reaction product was neutralized with sodium bicarbonate, treated with filter aid and activated charcoal, followed by pressure filtration and vacuum stripping. The viscous product (135 grams) comprises a 3-(morpholino)propylpolymethylsiloxane-poly(oxyethylene-oxypropylene) copolymer which, on the basis of the normalized average composition of Si—H Fluid II and the aforesaid desired stoichiometry, is assigned the average composition,

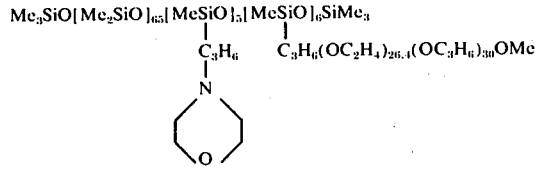

The product of this example is referred to herein as Surfactant B.

EXAMPLE 5

In accordance with this example, flame-retarded flexible polyether polyol-based urethane foam was prepared employing Surfactant B of Example 4 as the foam stabilizer. The foam formulation had the composition given in Table V.

TABLE V

| Component | FOAM FORMULATION C Parts By Weight |
|---|---|
| Polyether Polyol having a hydroxyl number of 56 produced by reacting glycerol and propylene oxide | 100 |
| Tolylene Diisocyanate (Index 105) [1] | 49.73 |
| Tris(2-chloroethyl)phosphate | 10 |
| Water | 4 |
| Bis[2-(N,N-dimethylamino)ethyl]ether employed as a 70 weight per cent solution in dipropylene glycol | 0.1 |
| Stannous Octoate | 0.35 |
| Surfactant B | 0.6 |

[1] As defined in footnote 2 of table I.

The foam of this example as well as the other polyether polyol-based urethane foam preparations described hereinbelow were prepared following substantially the same procedure which entailed the following manipulative steps: After dispensing the polyether polyol in a container (Lily Cup No. 32TN6), the flame-retardant (when used) is added thereto and dispersed therein with a spatula. The surfactant is then added from a syringe and is also dispersed with a spatula. After inserting a baffle, a premixture of the amine catalyst and blowing agent is added but not dispersed. The container containing the aforesaid mixture is then placed in a drill press and the mixture agitated 15 seconds at 2000 revolutions per minute, after which the stannous octoate co-catalyst is added from a syringe. After mixing for an additional 8 seconds, the diisocyanate reactant is added rapidly and the agitation is continued for another 7 seconds. After the mixing cycle, the mixture is poured into a parchment-lined container (12" × 12" × 12") supported by a wooden mold. The foam is allowed to rest in the container for at least 3 minutes and is then post-cured in a hot air oven at 125° C. for 8–10 minutes. After cutting, the height of the foam rise is measured, and foam samples are prepared for various physical property determinations including burning extent in the case of the flame-retarded foam products.

A control foam (Run K-3) was also formed employing Foam Formulation C of Table V except that in place of Surfactant B, the foam stabilizing component was an unmodified polymethylsiloxane-poly(oxyethylene-oxypropylene) copolymer having the average composition,

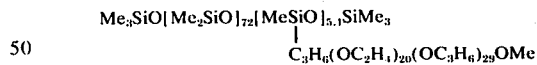

This copolymer is referred to herein as Surfactant BB. In preparing the control foam, Surfactant BB was also present in Foam Formulation C in a concentration of 0.6 part per 100 parts of the polyether polyol reactant.

The results of these foam preparations are given in the following Table VI.

TABLE VI

| Example | — | 5 |
|---|---|---|
| Control Run | K-3 | — |
| Surfactant | BB[1] | B[2] |
| Rise, inches | 7.1 | 7.0 |
| Breathability, SCFM | 3.4 | 4.5 |
| Burning extent, inches | 3.47 | 2.13 |
| Burning time, seconds | 62.3 | 36.7 |

[1] Not a surfactant of the invention.
[2] As described under Example 4.

As indicated by the data of Table VI, the flame-retarded foam stabilized with Surfactant B of the invention exhibited a substantially lower burning extent than that of the foam produced with Surfactant BB which is an otherwise excellent stabilizer of flexible polyether urethane foam.

EXAMPLE 6

In accordance with this example, a potency determination was made of Surfactant B. In addition to the surfactant, the other components of the foam-producing reaction mixture were as identified in the following Table VII.

TABLE VII

FOAM FORMULATION D

| Component | Parts By Weight |
|---|---|
| Polyether Polyol having a Hydroxyl No. of about 46, produced from glycerol, dipropylene glycol, propylene oxide and ethylene oxide. | 100 |
| Tolylene Diisocyanate[1] | 57 |
| Blowing Agent | |
| Water | 4.85 |
| Trichlorofluoromethane | 15.0 |
| Dimethylethanolamine | 0.35 |
| Stannous octoate | 0.3 |
| Surfactant | 0.6 |

[1] As defined in footnote 2 of Table I.

As a control foam (Run K-4), above-identified Surfactant BB was employed as the surfactant component of Foam Formulation D at a concentration of 0.6 part per 100 parts of the polyether polyol reactant. The results of these foam preparations are given in Table VIII which follows.

TABLE VIII

| Example | — | 6 |
|---|---|---|
| Control Run | K-4 | — |
| Surfactant | BB[1] | B[2] |
| Rise, inches | 11.0 | 11.4 |
| Breathability, SCFM | 6.0 | 6.8 |
| Top Collapse, inches | — | ([3]) |

[1] Not a surfactant of the invention.
[2] As described under Example 4.
[3] Less than one-half inch.

The data of Table VIII indicate that the potency of Surfactant B, as reflected by the foam rise, compares favorably with that of Surfactant BB in which the polysiloxane backbone is substituted with methyl groups only.

EXAMPLE 7

This example describes the preparation of a further illustrative morpholino-bearing copolymer of the invention, designated Surfactant C.

A. Preparation of Si—H Fluid III

The polymethylsiloxane hydride reactant employed in the preparation of Surfactant C was prepared by equilibration of a reaction mixture containing: (1) hexamethyldisiloxane, $Me_3SiOSiMe_3$, in an amount of 6.5 grams (0.04 mole); (2) polymeric methylsiloxane hydride in an amount of 36.0 grams, corresponding to 0.6 mole of $Me(H)SiO_{2/2}$; (3) cyclic dimethylsiloxane tetramer in an amount of 184.0 grams, corresponding to 2.49 moles of $Me_2SiO_{2/2}$; and (4) concentrated sulfuric acid catalyst (2.3 grams). The reaction mixture was stirred at room temperature overnight, and was then neutralized with excess sodium bicarbonate and treated with filter aid and activated charcoal. After stirring for an additional 20 hours, the mixture was pressure filtered and stripped of volatiles under vacuum. The product weighed 194 grams. Based upon the relative proportions of reactants (1)–(3) normalized to two moles of $Me_3SiO_{1/2}$, the average composition of the equilibrated polymethylsiloxane hydride (Si—H Fluid III) is:

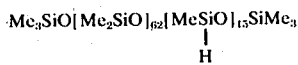

Analysis of Fluid III for silanic hydrogen provided 57.7 cc. $H_2$/gram, corresponding to a found Me(H)SiO content of 15.62 weight percent which is in substantial agreement with the theoretical content (15.93 weight percent) and the above average composition.

B. Preparation of Surfactant C

In this preparation, N-allylmorpholine and substantially the same polyether reactant described under part B of Example 4 above, were reacted with Si—H Fluid III. The unsaturated reactants were used in excess of the desired stoichiometric reaction which was to react the Si—H content of Fluid III (y+z = 15) with the allylmorpholine and polyether reactants in a mole ratio of 9:6, respectively. The polyether (111.5 grams, 0.0375 mole) was first combined with toluene (120 ml.) and dried as described in Example 4, after which there were added additional toluene (30 ml.) and 28.3 grams of Si—H Fluid III corresponding to 0.073 mole-equivalent of Me(H)SiO. The mixture was at a temperature of about 102° C. when 0.3 ml. of a platinum catalyst solution was added, the catalyst having been prepared by the reaction of chloroplatinic acid with octyl alcohol. After about 5 minutes, N-allylmorpholine (6.5 grams, about 0.05 mole) and about 10 ml. of toluene were added and heating was resumed. Additional catalyst was added and, when the residual Si—H content was reduced to 0.2 ml. $H_2$10.5 ml. of sample, the reaction mixture was cooled and treated as described under part B of Example 4. The slightly hazy liquid product (132.6 grams) comprises a 3-(morpholino)propyl-modified polymethylsiloxane-poly(oxyethylene-oxypropylene) copolymer which, on the basis of the normalized average composition of Si—H Fluid III and the aforesaid desired stoichiometry, is assigned the average composition,

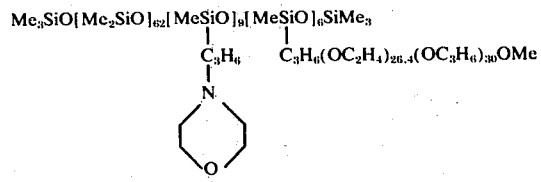

The product of this example is referred to herein as Surfactant C.

EXAMPLE 8

In this example, a further illustrative morpholino-bearing copolymer of the invention, designated Surfactant D, was prepared from an equilibrated polymethylsiloxane hydride (Si—H Fluid IV) having the average composition,

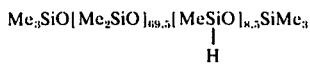

Si—H Fluid IV was prepared by equilibrating a reaction mixture containing: (1) 6.5 grams of $Me_3SiOSiMe_3$, corresponding to 0.08 mole of $Me_3SiO_{1/2}$; (2) polymeric methylsiloxane hydride in an amount of 20.4 grams, corresponding to 0.34 mole of $Me(H)SiO_{2/2}$; (3) cyclic dimethylsiloxane tetramer in an amount of 205.6 grams, corresponding to 2.78 moles of $Me_2SiO_{2/2}$; and (4) concentrated sulfuric acid catalyst (3 grams). The reaction mixture was equilibrated at room temperature with stirring for approximately 22 hours. The product was neutralized with excess sodium bicarbonate, treated with filter aid and activated charcoal, and was then pressure filtered and vacuum stripped of volatiles. Based upon the relative proportions of reactants (1)–(3), normalized to two moles of monofunctional units, the average composition of Si—H Fluid IV is as expressed above. This equilibrated product was then reacted with the polyether described under part B of Example 4 and N-allylmorpholine. The intended stoichiometry was to react the morpholine and polyether reactants with the Si—H content of Fluid IV ($y+z = 8.5$) in a mole ratio of 2.5:6, respectively. The platinum-catalyzed hydrosilation reaction was carried out in toluene substantially as described under part B of Example 7 employing the same platinum catalyst, 29.1 grams of Si—H Fluid IV, 111.5 grams of the polyether and 2.0 grams of N-allylmorpholine, until residual Si—H of the reaction mixture was reduced to 0.2 ml. $H_2$/0.5 ml. sample. The reaction mixture was neutralized and treated as described under part B of Example 4. The product (128.3 grams) of this example was a clear liquid. Based upon the normalized average composition of Si—H Fluid IV and the aforesaid intended stoichiometry, the liquid product of this example comprises a copolymer to which the following average composition is assigned:

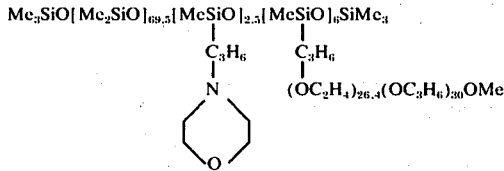

The liquid product of this example is referred to herein as Surfactant D.

EXAMPLE 9

This example describes the preparation of a further illustrative morpholino-bearing copolymer of the invention, designated Surfactant E.

A. Preparation of Si—H Fluid V

The polymethylsiloxane hydride reactant employed in providing Surfactant E was prepared by equilibration of a reaction mixture containing: (1) hexamethyldisiloxane, $Me_3SiOSiMe_3$, in an amount of 16.2 grams (0.1 mole); (2) polymeric methylsiloxane hydride in an amount of 120 grams, corresponding to 2 moles of $Me(H)SiO_{2/2}$; (3) cyclic dimethylsiloxane tetramer in an amount of 444 grams, corresponding to 6 moles of $Me_2SiO_{2/2}$; and (4) trifluoromethylsulfonic acid catalyst (2 grams). The reaction mixture was equilibrated for several days while magnetically stirred. The mixture was then treated with sodium bicarbonate, mechanically stirred and sparged with nitrogen for 2 hours, and heated at 120° C. for about 4 hours while sparging which was continued overnight. The mixture was then filtered. Based upon the relative proportions of reactants (1)–(3), normalized to two moles of $Me_3SiO_{1/2}$, the nominal average composition of the resulting polymethylsiloxane hydride is,

and the theoretical weight percent of Me(H)SiO is 20.66. Analysis of the product (Si—H Fluid V) for silanic hydrogen provided 74.6 cc. $H_2$/gram corresponding to a found Me(H)SiO content of 19.98 weight percent. Based upon the Si—H analysis, the average number of moles of $Me(H)SiO_{2/2}$ units is about 19 and thus the average composition of the product was taken as:

B. Preparation of Surfactant E

In this preparation, N-allylmorpholine and substantially the same polyether reactant described under part B of Example 4 above, were reacted with Si—H Fluid V. The intended stoichiometry was to react the morpholine and polyether reactants with the Si—H content of Fluid V ($y+z$ = about 19) in a mole ratio of 13:6, respectively. The platinum-catalyzed hydrosilation reaction was carried out in toluene substantially as described under part B of Example 7 employing the same platinum catalyst, 28.7 grams of Si—H Fluid V, 111.5 grams of the polyether and 9.0 grams of N-allylmorpholine, until the residual Si—H content of the reaction mixture was reduced to 0.6 ml. $H_2$/0.5 ml. sample. The reaction mixture was neutralized and treated as described under part B of Example 4. The liquid product of this example weighed 134 grams. Based upon the normalized average composition of Si—H Fluid V and the aforesaid intended stoichiometry, the liquid product of this example comprises a copolymer to which the following average composition is assigned:

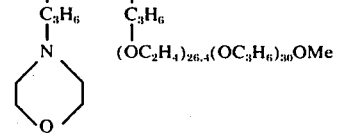

The liquid product of this example is referred to herein as Surfactant E.

EXAMPLES 10–13

In these examples, above-described Surfactants B, C, D and E of the invention were employed as the respective foam stabilizing components of a flame-retarded formulation in which the flame-retardant was tris(2,3-dichloropropyl)phosphate. The components and relative proportions of the reaction mixture are as set forth in the following Table IX.

TABLE IX

| FOAM FORMULATION E | |
|---|---|
| Components | Parts By Weight |
| Polyether Polyol having a Hydroxyl Number of about 46 produced by reacting glycerol, propylene oxide and ethylene oxide. | 100 |
| Tolylene Diisocyanate (Index 105)[1] | 48.4 |
| Water | 4 |
| Bis[2-(N,N-dimethylamino)ethyl]ether employed as a 70 weight percent solution in dipropylene glycol | 0.1 |
| Stannous Octoate | 0.25 |
| Tris(2,3-dichloropropyl)phosphate | 12.5 |
| Surfactant B, C, D or E | 0.6 |

[1] As identified in footnote 2 of Table I.

The results of these foam preparations are given in the following Table X.

TABLE X

| Example | 10 | 11 | 12 | 13 |
|---|---|---|---|---|
| Surfactant | B | C | D | E |
| Rise, inches | 6.7 | 6.7 | 6.6 | 6.5 |
| Breathability, SCFM | 4.8 | 4.6 | 4.4 | 5.3 |
| Burning extent, inches | 3.1 | 3.3 | 3.5 | 4.4 |
| Burning time, seconds | 66.2 | 73.3 | 80.2 | 101 |

As indicated by the results of these examples, samples of the flame-retarded flexible polyether urethane foams produced with the morpholino-modified copolymers of the invention had burning extents less than 5 inches and thus qualify for a self-extinguishing rating under ASTM D-1692-68. Although not run as a control with the series of foam preparations of Examples 10–13, it is noted that, when the above-described unmodified polymethylsiloxane-poly(oxyethyleneoxypropylene) copolymer referred to herein as Surfactant BB is employed as the foam stabilizing component of Foam Formulation E, also at 0.6 part per 100 parts of polyol, samples of the foam products have burning extents greater than 5 inches (e.g., about 6 inches) and thus do not qualify for an SE rating by the D-1692-68 flammability test.

EXAMPLES 14–16

In accordance with these examples, a potency determination was made of Surfactants C, D and E of the invention. For this purpose, they were employed as the surfactant component of non flame-retarded Foam Formulation D (Table VII). A control foam (Run K-5) was also prepared employing above-described Surfactant BB as the foam stabilizing component of the same formulation.

TABLE XI

| Example | — | 14 | 15 | 16 |
|---|---|---|---|---|
| Control Run | K-5 | — | — | — |
| Surfactant | BB[1] | C | D | E |
| Rise, inches | 11.2 | 11.1 | 11.9 | 10.8 |
| Breathability, SCFM | 5.7 | 3.5 | 5.5 | 6.9 |
| Top Collapse, inches | <½" | ½" | ½– | ¾" |
| Splits | None | None | None | None |

[1] Not a surfactant of the invention.

The results of Table XI further show that, from the standpoint of foam rise, Surfactants C, D and E of the invention are also potent stabilizers of flexible polyether urethane foam.

What is claimed is:

1. An organosilicone composition which comprises a polysiloxane-polyoxyalkylene copolymer containing monofunctional siloxy units and difunctional siloxy units, an average of between about 2 and about 30 silicon-bonded polyoxyalkylene blocks for every two moles of monofunctional units, and an average of from about 2 to about 100 silicon-bonded morpholino-bearing groups for every two moles of monofunctional units, wherein:

i. said polyoxyalkylene blocks have the average composition, $$-(R°)_r-(OC_aH_{2a})_b-OG$$

where $r$ is zero or one, $R°$ comprises a bivalent alkylene group a carbon atom of which is bonded to silicon, $-(OC_aH_{2a})_b-$ is a polyoxyalkylene chain where $a$ has a value from 2 to 4 and $b$ has an average value from about 3 to about 100, and G is an organic cap;

ii. said morpholino-bearing groups have the formula,

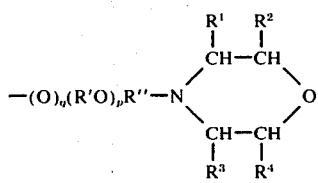

wherein $p$ is zero or has an average value from about one to about four, $q$ is zero or one provided $q$ is one when $p$ has a value of more than one, $R'$ is bivalent alkylene having from two to four carbon atoms, $R''$ is bivalent alkylene having from two to six carbon atoms, and $R^1$, $R^2$, $R^3$ and $R^4$ are independently hydrogen or alkyl of one to four carbon atoms; and iii. the monofunctional units of the copolymer have at least two alkyls of one to ten carbon atoms bonded to the respective silicon atoms thereof and the difunctional units have at least one alkyl of one to ten carbon atoms bonded to the respective silicon atoms thereof, the remaining organic group bonded to silicon of the respective monofunctional and difunctional siloxy units being alkyl of one to ten carbon atoms, said morpholino-bearing group or said polyoxyalkylene block, provided the average number of said morpholino-bearing groups and said polyoxyalkylene blocks contained in the copolymer is as aforesaid.

2. An organosilicone composition as defined in claim 1 in which the polysiloxane-polyoxyalkylene copolymer contains for every two moles of monofunctional units, an average of up to about 200 moles of said difunctional siloxy units wherein the remaining organic group bonded to the respective silicon atoms thereof is said alkyl of one to ten carbon atoms.

3. An organosilicone composition which comprises a polysiloxane-polyoxyalkylene copolymer containing monofunctional trialkylsiloxy units, $(R)_3SiO_{1/2}$, where R has from one to ten carbon atoms, and, for every two moles of monofunctional units, an average of from about 10 to about 200 dialkylsiloxy units having the unit formula, $(R)_2SiO_{2/2}$, where R has from one to ten carbon atoms, an average of from about 2 to about 100 difunctional morpholino-bearing alkylsiloxy units having the unit formula,

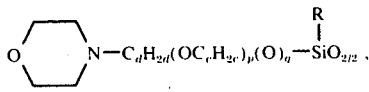

where R is alkyl of one to ten carbon atoms, $p$ is zero or has an average value from about one to about four, $q$ is zero or one provided $q$ is one when $p$ has a value of more than one, $c$ has a value from two to four and $d$ has a value from two or six.

and an average of from about 2 to about 30 difunctional siloxy units having the unit formula, $(R)(E)SiO_{2/2}$, where R is alkyl of one to ten carbon atoms and E is a polyoxyalkylene block having the average composition.

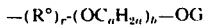

wherein $r$ is zero or one, $R°$ comprises a bivalent alkylene group a carbon atom of which is bonded to silicon, $-(OC_aH_{2a})_b-$ is a polyoxyalkylene chain where $a$ has a value from 2 to 4 provided the average polyoxyalkylene content of $-(OC_aH_{2a})_b-$ is constituted of from about 20 to about 75 weight percent of oxyethylene, and wherein $b$ has an average value from about 3 to about 100, and G is $R^\infty-$, $R^\infty C(O)-$ or $R^\infty NHC(O)-$ where $R^\infty$ is a monovalent hydrocarbon group having from 1 to 12 carbon atoms.

4. An organosilicone composition as defined in claim 3 in which the said copolymer contains an average of from about 20 to about 100 of said dialkylsiloxy units, an average of from about 2 to about 30 of said difunctional morpholino-bearing alkylsiloxy units and an average of from about 2 to about 10 of said difunctional siloxy units having the unit formula, $(R)(E)SiO_{2/2}$.

5. An organosilicone composition which comprises a polysiloxane-polyoxyalkylene copolymer containing monofunctional trialkylsiloxy units, $(R)_3SiO_{1/2}$, where R has from one to ten carbon atoms, and, for every two moles of monofunctional units, zero or an average of up to about 20 dialkylsiloxy units having the unit formula, $(R)_2SiO_{2/2}$, where R has from one to ten carbon atoms, an average of from about 2 to about 20 difunctional morpholino-bearing alkylsiloxy units having the unit formula,

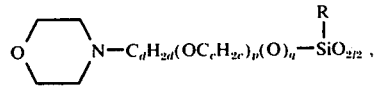

where R is alkyl of one to ten carbon atoms, $p$ is zero or has an average value from about one to about four, $q$ is zero or one provided $q$ is one when $p$ has a value of more than one, $c$ has a value from two to four and $d$ has a value from two to six, and an average of from about 2 to about 30 difunctional siloxy units having the unit formula, $(R)(E)SiO_{2/2}$, where R is alkyl of one to ten carbon atoms and E is a polyoxyalkylene block having the average composition,

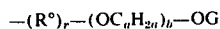

wherein $r$ is zero or one, $R°$ comprises a bivalent alkylene group a carbon atom of which is bonded to silicon, $-(OC_aH_{2a})_b-$ is a polyoxyalkylene chain where $a$ has a value from 2 to 4 provided the average polyoxyalkylene content of $-(OC_aH_{2a})_b-$ is constituted of at least 75 weight percent of oxyethylene, and wherein $b$ has an average value from about 3 to about 100, and G is $R^\infty-$, $R^\infty C(O)-$ or $R^\infty NHC(O)-$ where $R^\infty$ is a monovalent hydrocarbon group having from 1 to 12 carbon atoms.

6. An organosilicone composition as defined in claim 5 in which the said copolymer contains an average of no more than about 10 of said dialkylsiloxy units, an average of no more than about 10 of said difunctional morpholino-bearing alkylsiloxy units, and an average of no more than about 15 of said difunctional siloxy units having the unit formula, $(R)(E)SiO_{2/2}$.

7. An organosilicone composition which comprises a polysiloxane-polyoxyalkylene copolymer having the average composition,

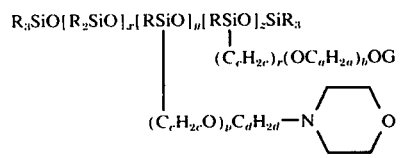

wherein: R is alkyl of one to four carbon atoms; G is an organic cap; $p$ is zero or one; $c$ has a value from two to four; $d$ has a value from two to six; $r$ is zero or one; $e$ has a value from two to six; $b$ has an average value from about 3 to about 100; $a$ has a value from two to four provided at least 20 weight percent of $-(OC_aH_{2a})_b-$ is constituted of oxyethylene; $x$ is zero or a positive number having an average value of up to about 200; $y$ has an average value from about 2 to about 100; and $z$ has an average value from about 2 to about 30.

8. An organosilicone composition as defined in claim 7 in which $x$ of said copolymer has an average value of at least about 10, and the average polyoxyalkylene content of $-(OC_aH_{2a})_b-$ is constituted of from about 20 to about 65 weight percent of oxyethylene.

9. An organosilicone composition as defined in claim 7 in which $x$ of said copolymer is a positive number having an average value of no more than about 20, $y$ has an average value of no more than about 20, $b$ has an average value no more than about 30, and the polyoxyalkylene content of $-(OC_aH_{2a})_b-$ is constituted on the average of at least 75 weight percent oxyethylene.

10. An organosilicone composition as defined in claim 7 in which the R groups of said copolymer are methyl.

11. An organosilicone composition as defined in claim 7 in which $r$ of said copolymer is zero.

12. An organosilicone composition as defined in claim 7 in which $r$ of said copolymer is one and $e$ has a value of no more than four.

13. An organosilicone composition as defined in claim 7 in which $p$ of said copolymer is one.

14. An organosilicone composition as defined in claim 7 in which $p$ of said copolymer is zero.

15. An organosilicone composition as defined in claim 7 in which G of said copolymer is a monovalent hydrocarbon group having from 1 to 12 carbon atoms.

16. A composition as defined in claim 15 in which G is alkyl of one to four carbon atoms.

17. A composition as defined in claim 15 in which G is aryl.

UNITED STATES PATENT OFFICE
CERTIFICATE OF CORRECTION

Patent No. 4,018,723     Dated April 19, 1977

Inventor(s) Bernard Kanner and Bela Prokai

It is certified that error appears in the above-identified patent and that said Letters Patent are hereby corrected as shown below:

Column 1, line 55, for "flame" read -- foam --. Column 5, line 33, for "-Rf"-" read -- -R"- --. Column 7, line 9, before "GO-" read the parenthesis mark -- ( --; line 67, before "-derived" read -- polyol --. Column 15, lines 3-9, that portion of the formula reading $$SIR_3 \quad \text{should read} \quad SiR_3$$

Column 16, line 7, for "equation" read -- equations --. Column 17, lines 48-51, that portion of the second formula reading $$-O_2H_4- \quad \text{should read} \quad -C_2H_4-$$

Column 25, line 6, for "-phenylenediisocyantate" read -- -phenylenediisocyanate --; line 7, for "-diemthyl-" read -- -dimethyl- --. Column 26, line 2, delete the first occurrence of "about 90 to". Column 27, line 22, for "trichloromethane, -di-" read -- trichlorofluoromethane, di- --; line 46, for "fluorcarbon" read -- fluorocarbon --. Column 28, line 61, for "flexiblity" read -- flexibility --. Column 29, line 7, for "ar" read -- art --; line 61, for "ferived" read -- derived --. Column 30, line 27, for "rectants" read -- reactants --. Column 32, Table I, in the fifth line of footnote 1, for "23°C." read -- 25°C. --; in the first line of footnote 2, after "percent" read the parenthesis mark -- ) --. Column 38, line 41, for "$H_2 10.5$" read -- $H_2/0.5$ --. Column 41, Table XI, under column headed "15", the next to last entry reading "1/2-" should read -- 1/2" --. Column 46, lines 62-67, that portion of the formula reading $$(OC_2H_4)_m \quad \text{should read} \quad (OC_2H_4)_n$$

alkylene having from two to four carbon atoms, R″ is bivalent alkylene having from two to six carbon atoms, and $R^1$, $R^2$, $R^3$ and $R^4$ are independently hydrogen or alkyl having from one to four carbon atoms;

and, when reactant (a) is a polyether polyol, $x$ has an average value from about 10 to about 200, $y$ has an average value from about 2 to about 100 and $z$ has an average value from about 2 to about 30, provided an average of from about 50 to about 85 weight percent of said copolymer is constituted of E; and the average polyoxyalkylene content of $-(C_aH_{2a}O)_b-$ of E is constituted of from about 20 to about 75 weight percent of oxyethylene; and when reactant (a) is a polyester polyol, $x$ is zero or a positive number having an average value up to about 20, $y$ has an average value from about 2 to about 20 and $z$ has an average value from about 2 to about 30, provided an average of from about 50 to about 85 weight percent of said copolymer is constituted of E; and the average polyoxyalkylene content of $-(C_aH_{2a}O)_b-$ of E is constituted of at least 75 weight percent of oxyethylene.

36. A process as defined in claim 35 in which said reaction mixture contains a flame-retardant as an additional component thereof.

37. A flame-retarded flexible polyurethane foam produced by the process of claim 36.

38. A process as defined in claim 35 in which the flame-retardant contains phosphorus or halogen, both phosphorus and halogen, or phosphorus and nitrogen.

39. A process as defined in claim 35 in which the flame-retardant is present in the reaction mixture in an amount from about 1 to about 30 parts by weight per 100 parts by weight of polyol reactant (a).

40. A flame-retardant polyester-based urethane foam which comprises the product formed by simultaneously reacting and foaming a reaction mixture containing: (a) a polyester polyol reactant containing an average of at least two hydroxyl groups per molecule; (b) an organic polyisocyanate reactant containing at least two isocyanato groups per molecule; (c) water as a source of blowing action; (d) a catalyst comprising a tertiary-amine; (e) a flame-retarding agent; and (f) a foam stabilizer comprising a polysiloxane-polyoxyethylene copolymer having the average composition,

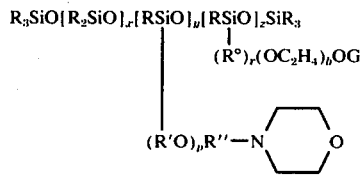

wherein: R is alkyl having from one to four carbon atoms; R′ is bivalent alkylene of 2 to 4 carbon atoms; R″ is bivalent alkylene of 2 to 6 carbon atoms; R° comprises a bivalent alkylene group of from 2 to 6 carbon atoms a carbon atom of which is bonded to silicon; G is an organic cap; $r$ is zero or one; $p$ is zero or one; $b$ has an average value from about 3 to about 30; $x$ is zero or a positive number having an average value up to about 20, $y$ has an average value from about 2 to about 20, and $z$ has an average value from about 2 to about 30, provided the average weight of said copolymer attributable to $-(R°)_r(OC_2H_4)_bOG$ is from about 50 to about 85 weight percent.

* * * * *

UNITED STATES PATENT OFFICE
CERTIFICATE OF CORRECTION

Patent No. 4,018,723　　　　　　Dated April 19, 1977

Inventor(s) Bernard Kanner and Bela Prokai

It is certified that error appears in the above-identified patent and that said Letters Patent are hereby corrected as shown below:

Column 1, line 55, for "flame" read -- foam --. Column 5, line 33, for "-Rf"-" read -- -R"- --. Column 7, line 9, before "GO-" read the parenthesis mark -- ( --; line 67, before "-derived" read -- polyol --. Column 15, lines 3-9, that portion of the formula reading $$SIR_3 \quad \text{should read} \quad SiR_3$$

Column 16, line 7, for "equation" read -- equations --.
Column 17, lines 48-51, that portion of the second formula reading $$-O_2H_4- \quad \text{should read} \quad -C_2H_4-$$

Column 25, line 6, for "-phenylenediisocyantate" read -- -phenylenediisocyanate --; line 7, for "-diemthyl-" read -- -dimethyl- --. Column 26, line 2, delete the first occurrence of "about 90 to". Column 27, line 22, for "trichloromethane, -di-" read -- trichlorofluoromethane, di- --; line 46, for "fluorcarbon" read -- fluorocarbon --.
Column 28, line 61, for "flexiblity" read -- flexibility --.
Column 29, line 7, for "ar" read -- art --; line 61, for "ferived" read -- derived --. Column 30, line 27, for "rectants" read -- reactants --. Column 32, Table I, in the fifth line of footnote 1, for "23°C." read -- 25°C. --; in the first line of footnote 2, after "percent" read the parenthesis mark -- ) --. Column 38, line 41, for "$H_2 10.5$" read -- $H_2/0.5$ --. Column 41, Table XI, under column headed "15", the next to last entry reading "1/2-" should read -- 1/2" --. Column 46, lines 62-67, that portion of the formula reading $$(OC_2H_4)_m \quad \text{should read} \quad (OC_2H_4)_n$$

UNITED STATES PATENT OFFICE
CERTIFICATE OF CORRECTION

Patent No. 4,018,723          Dated April 19, 1977

Inventor(s) Bernard Kanner and Bela Prokai

It is certified that error appears in the above-identified patent and that said Letters Patent are hereby corrected as shown below:

Column 47, line 28, for "flameretarding" read -- flame-retarding --.

Signed and Sealed this sixteenth Day of August 1977

[SEAL]

Attest:

RUTH C. MASON  
*Attesting Officer*

C. MARSHALL DANN  
*Commissioner of Patents and Trademarks*